US010044067B2

(12) United States Patent
Iwama et al.

(10) Patent No.: US 10,044,067 B2
(45) Date of Patent: Aug. 7, 2018

(54) SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Murata Manufacturing Co., Ltd., Kyoto (JP)

(72) Inventors: Masayuki Iwama, Fukushima (JP); Shinji Hatake, Fukushima (JP); Masayuki Ihara, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/303,699

(22) PCT Filed: Mar. 5, 2015

(86) PCT No.: PCT/JP2015/056463
§ 371 (c)(1),
(2) Date: Oct. 12, 2016

(87) PCT Pub. No.: WO2015/163017
PCT Pub. Date: Oct. 29, 2015

(65) Prior Publication Data
US 2017/0047613 A1    Feb. 16, 2017

(30) Foreign Application Priority Data
Apr. 21, 2014    (JP) .................. 2014-087174

(51) Int. Cl.
*H01M 10/0567*    (2010.01)
*H01M 4/133*    (2010.01)
(Continued)

(52) U.S. Cl.
CPC .......... *H01M 10/0567* (2013.01); *B25F 5/00* (2013.01); *B60L 11/1811* (2013.01);
(Continued)

(58) Field of Classification Search
CPC .......... H01M 4/133; H01M 4/36; H01M 4/48; H01M 10/052; H01M 10/0567;
(Continued)

(56) References Cited

U.S. PATENT DOCUMENTS

2011/0274987 A1 * 11/2011 Ihara ................. H01M 10/052
429/337
2013/0130128 A1 * 5/2013 Okamoto .......... H01M 10/0567
429/338
(Continued)

FOREIGN PATENT DOCUMENTS

CN    103959547 A    7/2014
JP    2005-293942 A    10/2005
(Continued)

OTHER PUBLICATIONS

International Search Report and Written Opinion of PCT Application No. PCT/JP2015/056463, dated Jun. 9, 2015, 11 pages of English Translation and 10 pages of ISRWO.
(Continued)

*Primary Examiner* — Mark F. Huff
*Assistant Examiner* — Monique M Wills
(74) *Attorney, Agent, or Firm* — Chip Law Group

(57) ABSTRACT

A secondary battery includes a cathode, an anode, and a nonaqueous electrolytic solution. The anode contains a carbon material and silicon oxide, and a weight ratio (%) of the silicon oxide with respect to a total of the carbon material and the silicon oxide is within a range of 0.01% to 20% both inclusive. The nonaqueous electrolytic solution contains an unsaturated cyclic carbonate ester.

14 Claims, 7 Drawing Sheets

(51) Int. Cl.
　　　*H01M 4/36*　　　(2006.01)
　　　*H01M 4/48*　　　(2010.01)
　　　*H01M 10/052*　　(2010.01)
　　　*B25F 5/00*　　　(2006.01)
　　　*B60L 11/18*　　　(2006.01)
　　　*H01M 2/26*　　　(2006.01)
　　　*H01M 2/34*　　　(2006.01)
　　　*H01M 4/131*　　(2010.01)
　　　*H01M 4/505*　　(2010.01)
　　　*H01M 4/525*　　(2010.01)
　　　*H01M 4/587*　　(2010.01)
　　　*H01M 4/62*　　　(2006.01)
　　　*H01M 10/0525*　(2010.01)
　　　*H01M 10/0587*　(2010.01)
　　　*H01M 10/42*　　(2006.01)
　　　*H01M 10/48*　　(2006.01)
　　　*H01M 4/02*　　　(2006.01)

(52) U.S. Cl.
　　　CPC ......... *B60L 11/1864* (2013.01); *H01M 2/263* (2013.01); *H01M 2/348* (2013.01); *H01M 4/131* (2013.01); *H01M 4/133* (2013.01); *H01M 4/36* (2013.01); *H01M 4/48* (2013.01); *H01M 4/505* (2013.01); *H01M 4/525* (2013.01); *H01M 4/587* (2013.01); *H01M 4/622* (2013.01); *H01M 10/052* (2013.01); *H01M 10/0525* (2013.01); *H01M 10/0587* (2013.01); *H01M 10/425* (2013.01); *H01M 10/486* (2013.01); *H01M 2004/027* (2013.01); *H01M 2004/028* (2013.01); *H01M 2010/4278* (2013.01); *H01M 2200/106* (2013.01); *H01M 2220/10* (2013.01); *H01M 2220/20* (2013.01); *H01M 2220/30* (2013.01); *Y02E 60/122* (2013.01); *Y02T 10/7011* (2013.01)

(58) Field of Classification Search
　　　CPC .......... H01M 10/425; H01M 10/0587; H01M 10/0525; H01M 4/622; H01M 4/587; H01M 4/525; Y02E 60/122

See application file for complete search history.

(56) References Cited

U.S. PATENT DOCUMENTS

| | | | | |
|---|---|---|---|---|
| 2014/0162123 | A1* | 6/2014 | Fukuoka | H01M 4/483 |
| | | | | 429/218.1 |
| 2014/0166929 | A1* | 6/2014 | Takeuchi | H01M 4/625 |
| | | | | 252/182.1 |
| 2014/0234704 | A1 | 8/2014 | Kamizori et al. | |
| 2017/0288219 | A1* | 10/2017 | Hirose | H01M 4/485 |

FOREIGN PATENT DOCUMENTS

| | | |
|---|---|---|
| JP | 2006-196338 | 7/2006 |
| JP | 2009-238663 A | 10/2009 |
| JP | 2010-092834 | 4/2010 |
| JP | 2011-233245 A | 11/2011 |
| JP | 2012-003997 | 1/2012 |
| JP | 2012-3997 A | 1/2012 |
| JP | 2013-062072 | 4/2013 |
| JP | 2013-62072 A | 4/2013 |
| JP | 2013-077398 | 4/2013 |
| JP | 2013-131395 A | 7/2013 |
| JP | 2013-178913 A | 9/2013 |
| KR | 10-2014-0072872 A | 6/2014 |
| TW | 201332182 A | 8/2013 |
| WO | 2013/047747 A1 | 4/2013 |
| WO | 2014/073647 A1 | 5/2014 |

OTHER PUBLICATIONS

International Preliminary Report on Patentability of PCT Application No. PCT/JP2015/056463, dated Oct. 25, 2016, 01 pages of English Translation and 06 pages of ISRWO.

* cited by examiner

[ FIG. 1 ]
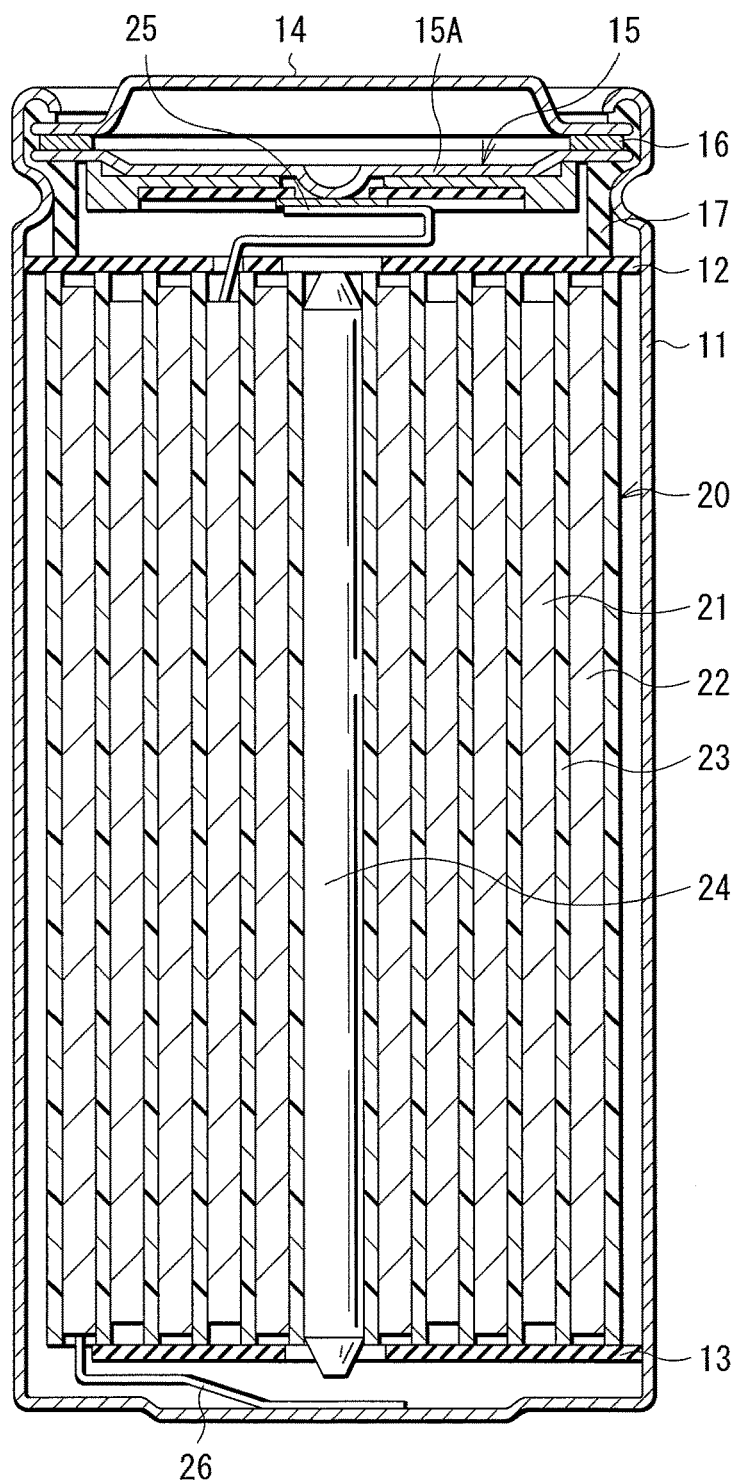

[ FIG. 2 ]
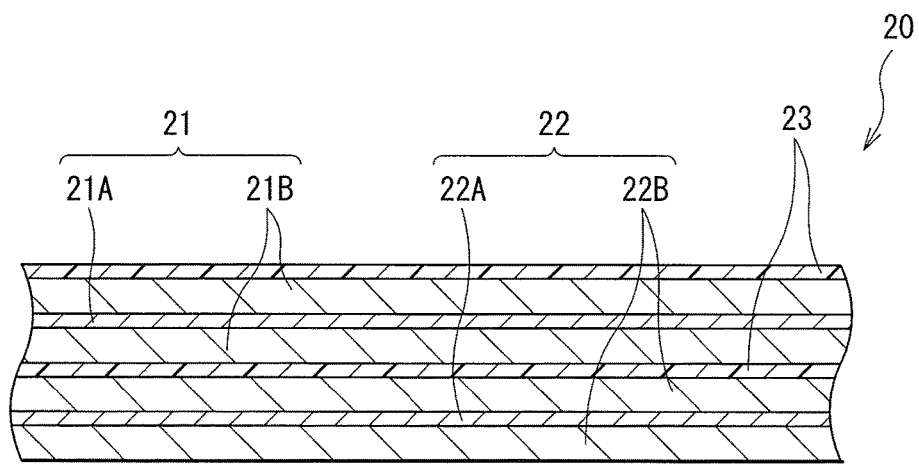

[FIG. 3]
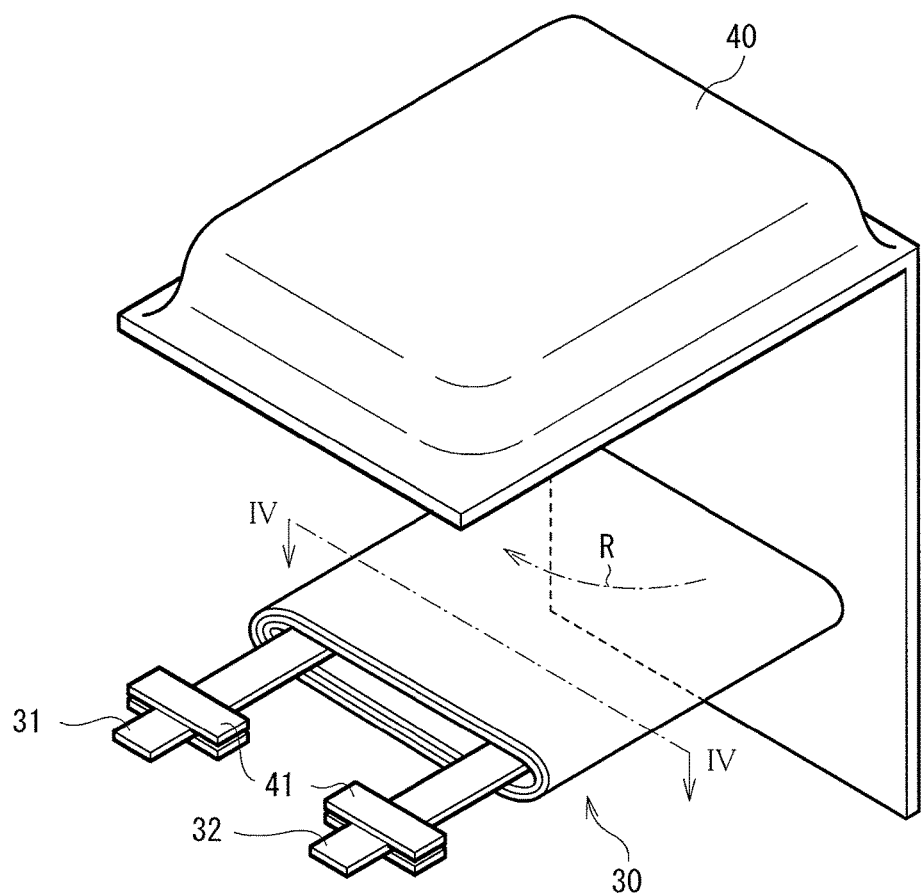

[ FIG. 4 ]
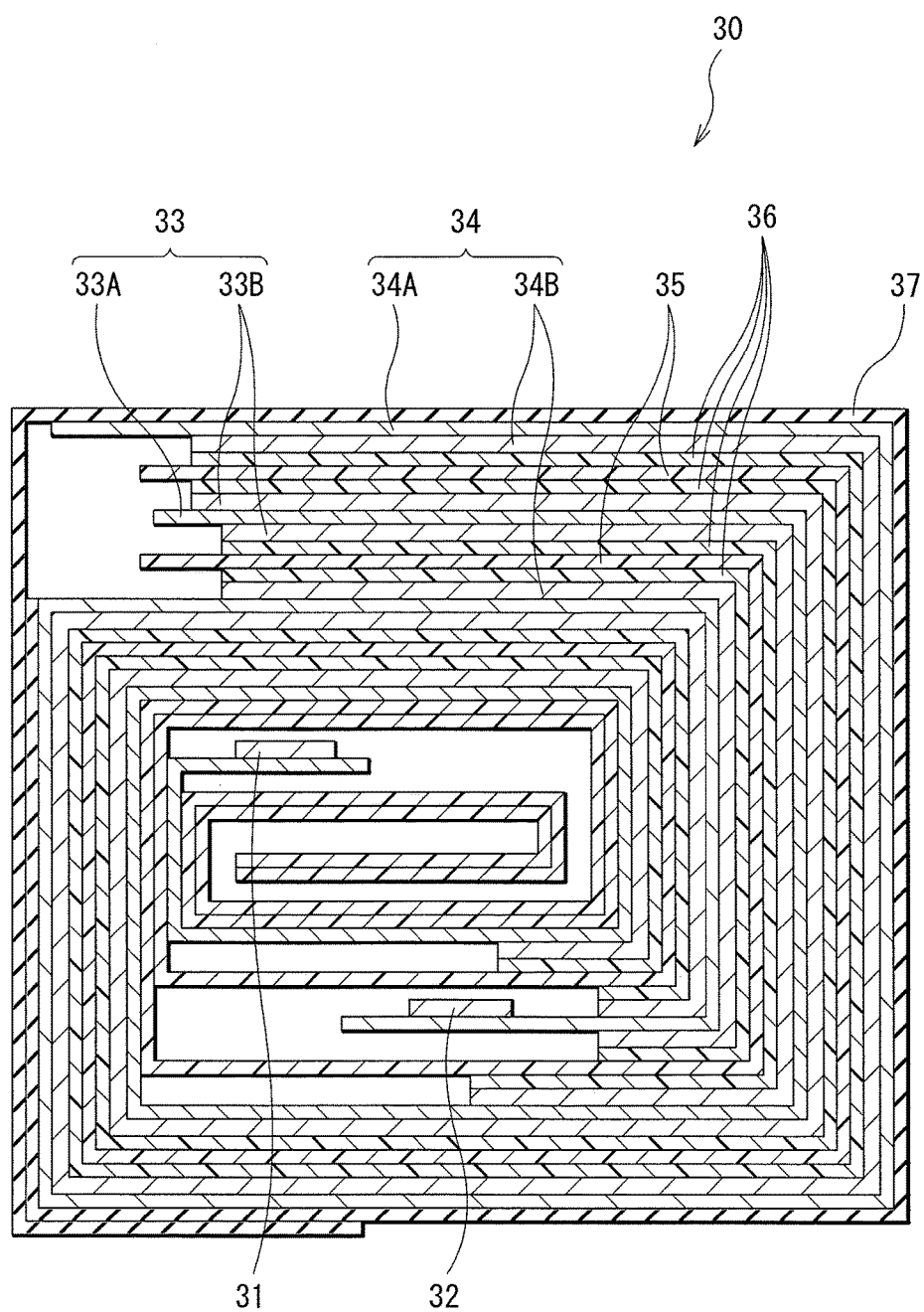

[ FIG. 5 ]
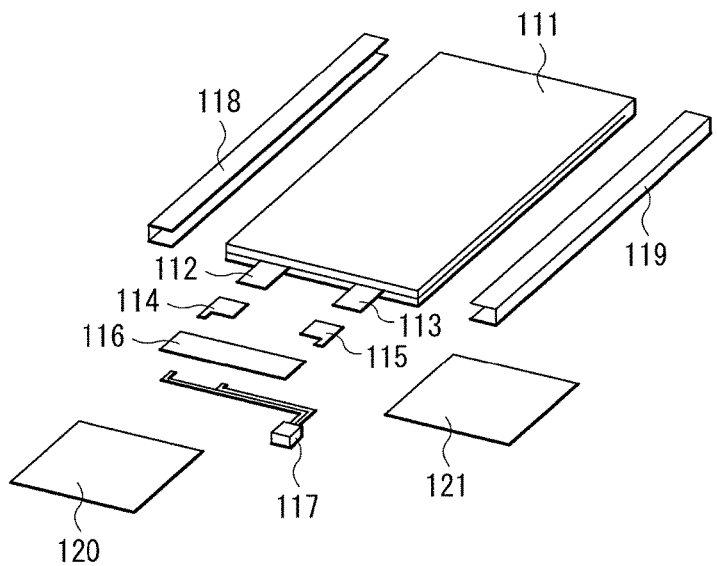
[ FIG. 6 ]
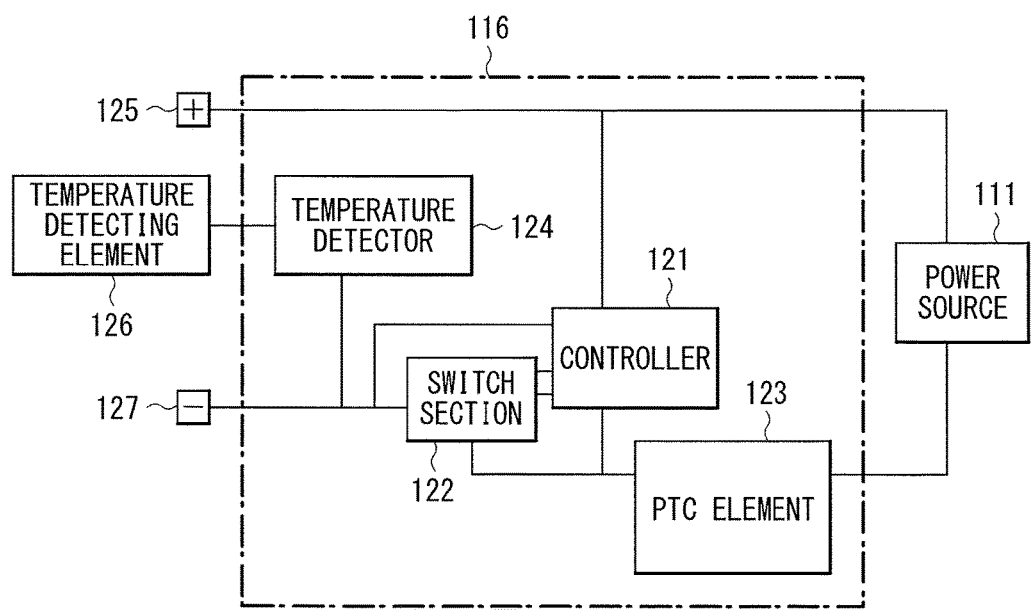

[ FIG. 7 ]
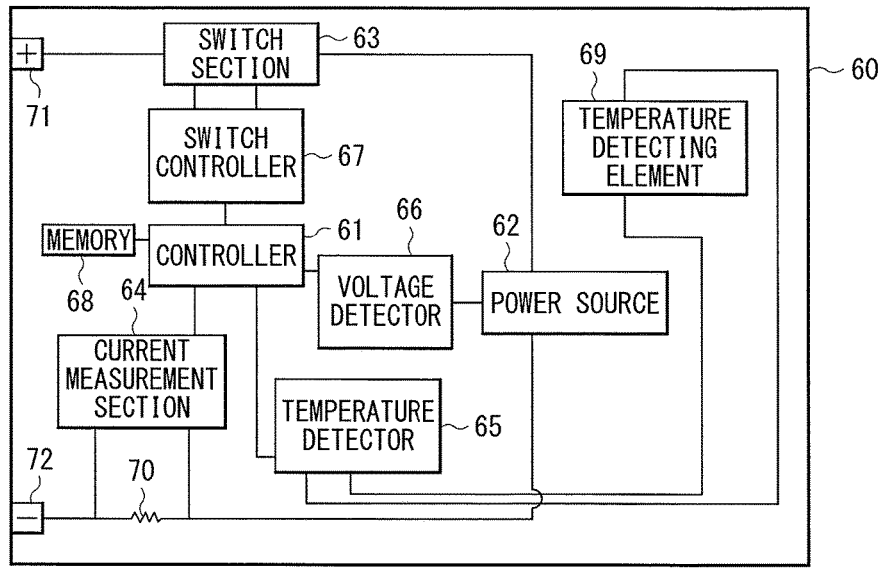
[ FIG. 8 ]
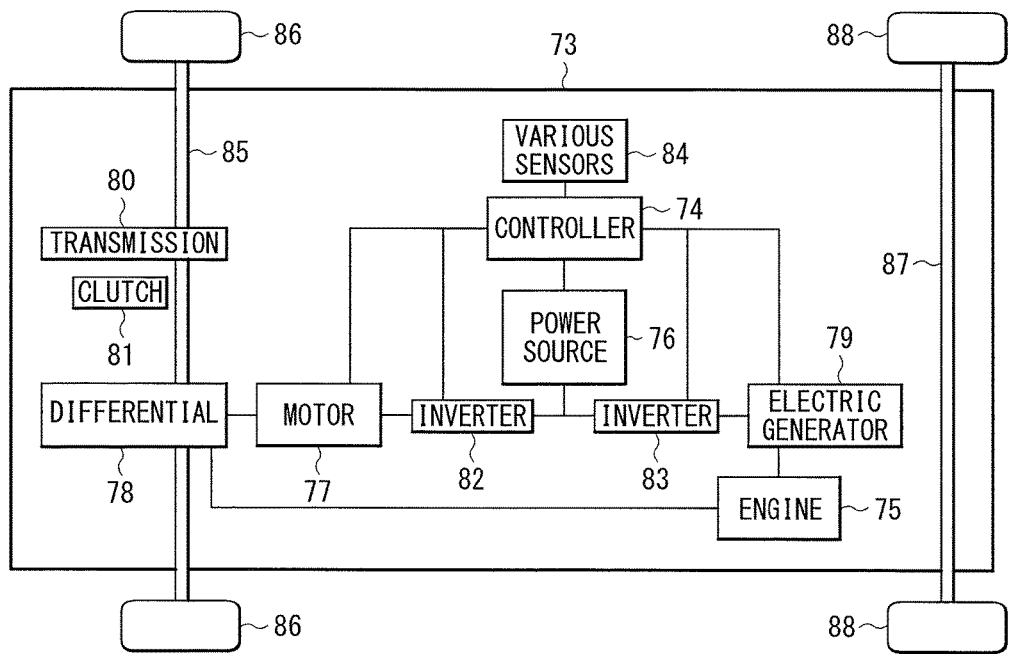

[ FIG. 9 ]
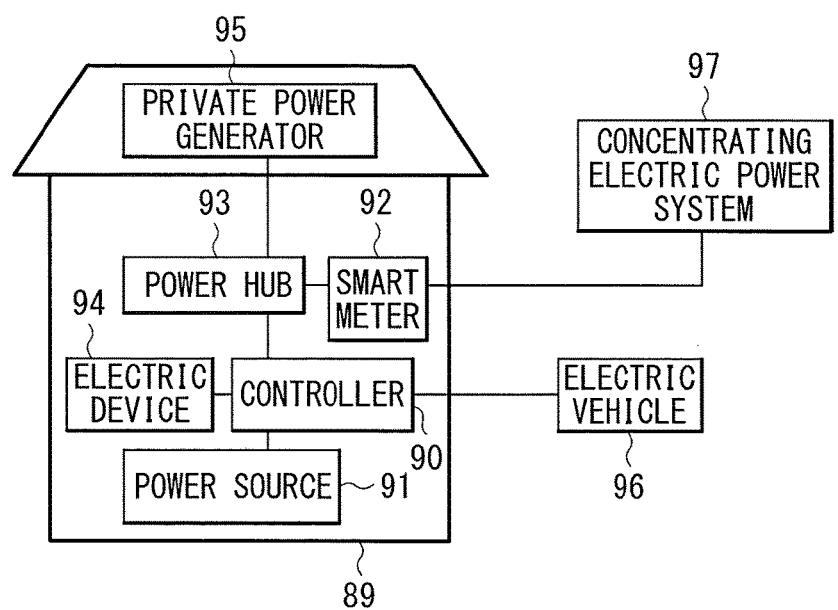
[ FIG. 10 ]
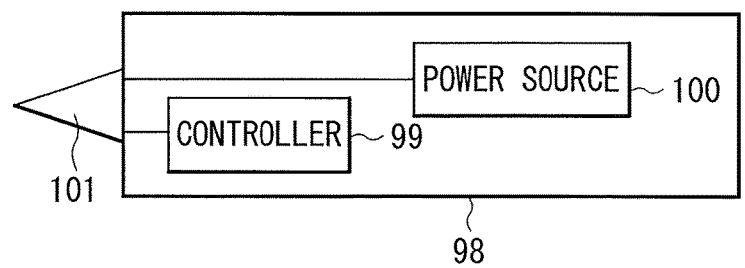

SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS REFERENCE TO RELATED APPLICATIONS

This application is a U.S. National Phase of International Patent Application No. PCT/JP2015/056463 filed on Mar. 5, 2015, which claims priority benefit of Japanese Patent Application No. JP 2014-087174 filed in the Japan Patent Office on Apr. 21, 2014. Each of the above-referenced applications is hereby incorporated herein by reference in its entirety.

TECHNICAL FIELD

The present technology relates to a secondary battery including a cathode, an anode, and a nonaqueous electrolytic solution, and a battery pack, an electric vehicle, an electric power storage system, an electric power tool, and an electronic apparatus each of which uses the secondary battery.

BACKGROUND ART

Various electronic apparatuses such as mobile phones and personal digital assistants (PDAs) have been widely used, and it has been demanded to further reduce size and weight of the electronic apparatuses and to achieve their longer lives. Accordingly, batteries, in particular, small and lightweight secondary batteries that have ability to achieve high energy density have been developed as power sources for the electronic apparatuses.

Applications of the secondary battery are not limited to the electronic apparatuses described above, and it has been also considered to apply the secondary battery to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant, which makes it possible to achieve higher energy density than other batteries such as a lead-acid battery and a nickel-cadmium battery.

The secondary battery includes a cathode, an anode, and an electrolytic solution. The cathode includes a cathode active material involved in charge-discharge reaction, and the anode includes an anode active material involved in charge-discharge reaction. The electrolytic solution includes a solvent and an electrolyte salt. The configuration of the secondary battery exerts a large influence on battery characteristics. Accordingly, various studies have been conducted on the configuration of the secondary battery.

More specifically, in order to achieve superior battery characteristics, a metal-based material such as silicon is used as the anode active material, and, for example, an unsaturated cyclic carbonate ester is used as an additive of the electrolytic solution (for example, refer to Patent Literature 1). Moreover, in order to suppress expansion and contraction of the anode during charge and discharge, a mixture of an alloyed material and a carbon material is used as the anode active material (for example, refer to Patent Literature 2).

CITATION LIST

Patent Literature

Patent Literature 1: Japanese Unexamined Patent Application Publication No. 2013-131395
Patent Literature 2: Japanese Unexamined Patent Application Publication No. 2009-238663

SUMMARY

Electronic apparatuses and other apparatuses are more frequently used in association with higher performance and more multi-functionality thereof. Accordingly, secondary batteries tend to be frequently charged and discharged. For this reason, there is still room for improvement in battery characteristics of the secondary batteries.

It is therefore desirable to provide a secondary battery, a battery pack, an electric vehicle, an electric power storage system, an electric power tool, an electronic apparatus each of which makes it possible to achieve superior battery characteristics.

A secondary battery according to an embodiment of the present technology includes a cathode, an anode, and a nonaqueous electrolytic solution. The anode contains a carbon material and silicon oxide. A weight ratio (%) of the silicon oxide with respect to a total of the carbon material and the silicon oxide is within a range of 0.01% to 20% both inclusive. The nonaqueous electrolytic solution contains an unsaturated cyclic carbonate ester.

A battery pack, an electric vehicle, an electric power storage system, an electric power tool, and an electronic apparatus according to embodiments of the present technology each include a secondary battery, and the secondary battery has a similar configuration to that of the secondary battery according to the foregoing embodiment of the present technology.

It is to be noted that the weight ratio (%) is calculated by [a weight of the silicon oxide/(a weight of the carbon material+the weight of the silicon oxide)]×100. Moreover, the unsaturated cyclic carbonate ester is a cyclic carbonate ester having one or more unsaturated bonds (carbon-carbon double bonds).

According to the secondary battery of the embodiment of the present technology, the anode contains the carbon material and the silicon oxide, the weight ratio of the silicon oxide is within a range of 0.01% to 20% both inclusive, and the nonaqueous electrolytic solution contains the unsaturated cyclic carbonate ester. This makes it possible to achieve superior battery characteristics. Moreover, in the battery pack, the electric vehicle, the electric power storage system, the electric power tool, or the electronic apparatus of the embodiment of the present technology, similar effects are achievable. Note that effects described here are non-limiting. Effects achieved by the present technology may be one or more of effects described in the present technology.

BRIEF DESCRIPTION OF DRAWINGS

FIG. 1 is a cross-sectional view of a configuration of a secondary battery (cylindrical type) according to an embodiment of the present technology.

FIG. 2 is an enlarged cross-sectional view of part of a spirally wound electrode body illustrated in FIG. 1.

FIG. 3 is a perspective view of a configuration of another secondary battery (laminated film type) according to an embodiment of the present technology.

FIG. 4 is a cross-sectional view taken along a line IV-IV of a spirally wound electrode body illustrated in FIG. 3.

FIG. 5 is a perspective view of a configuration of an application example (a battery pack: single battery) of the secondary battery.

FIG. 6 is a block diagram illustrating a configuration of the battery back illustrated in FIG. 5.

FIG. 7 is a block diagram illustrating a configuration of an application example (a battery back: assembled battery) of the secondary battery.

FIG. 8 is a block diagram illustrating a configuration of an application example (an electric vehicle) of the secondary battery.

FIG. 9 is a block diagram illustrating a configuration of an application example (an electric power storage system) of the secondary battery.

FIG. 10 is a block diagram illustrating a configuration of an application example (an electric power tool) of the secondary battery.

EMBODIMENTS FOR CARRYING OUT THE INVENTION

In the following, some embodiments of the present technology are described in detail with reference to the drawings. It is to be noted that description is given in the following order.

1. Secondary Battery
1-1. Lithium-ion Secondary Battery (Cylindrical Type)
1-2. Lithium-ion Secondary Battery (Laminated Film Type)
2. Applications of Secondary Battery
2-1. Battery Pack (Single Battery)
2-2. Battery Pack (Assembled Battery)
2-3. Electric Vehicle
2-4. Electric Power Storage System
2-5. Electric Power Tool (1. Secondary Battery)

First, description is given of a secondary battery according to an embodiment of the present technology.

(1-1. Lithium-Ion Secondary Battery (Cylindrical Type))

FIG. 1 and FIG. 2 each illustrate a cross-sectional configuration of the secondary battery. FIG. 2 illustrates enlarged part of a spirally wound electrode body 20 illustrated in FIG. 1.

The secondary battery described here may be, for example, a secondary battery (a lithium-ion secondary battery) in which a capacity of an anode 22 is obtained by insertion and extraction of lithium as an electrode reactant.

[Whole Configuration of Secondary Battery]

The secondary battery may be, for example, a so-called cylindrical type secondary battery. For example, the secondary battery may contain a pair of insulating plates 12 and 13 and the spirally wound electrode body 20 inside a battery can 11 having a substantially hollow cylindrical shape, as illustrated in FIG. 1. In the spirally wound electrode body 20, for example, a cathode 21 and an anode 22 may be stacked with a separator 23 in between and may be spirally wound. The spirally wound electrode body 20 is impregnated with an electrolytic solution that is a liquid electrolyte.

The battery can 11 has a hollow structure in which one end of the battery can 11 is closed and the other end of the battery can 11 is open. The battery can 11 may be made of, for example, one or more of iron (Fe), aluminum (Al), an alloy thereof, or any other material. A surface of the battery can 11 may be plated with, for example, nickel (Ni). The pair of insulating plates 12 and 13 is so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 are swaged with a gasket 17, by which the battery can 11 is hermetically sealed. The battery cover 14 may be made of, for example, a similar material to the material of the battery can 11. Each of the safety valve mechanism 15 and the PTC device 16 is provided on the inner side of the battery cover 14, and the safety valve mechanism 15 is electrically coupled to the battery cover 14 via the PTC device 16. In the safety valve mechanism 15, when an internal pressure of the battery can 11 reaches a certain level or higher as a result of, for example, internal short circuit or heating from outside, a disk plate 15A inverts. This cuts electric connection between the battery cover 14 and the spirally wound electrode body 20. In order to prevent abnormal heat generation resulting from a large current, resistance of the PTC device 16 increases as a temperature rises. The gasket 17 may be made of, for example, an insulating material. A surface of the gasket 17 may be coated with asphalt.

For example, a center pin 24 may be inserted in the center of the spirally wound electrode body 20. However, the center pin 24 may not be inserted in the center of the spirally wound electrode body 20. A cathode lead 25 made of, for example, a conductive material such as aluminum may be coupled to the cathode 21, and an anode lead 26 made of, for example, a conductive material such as nickel may be coupled to the anode 22. For example, the cathode lead 25 may be attached to the safety valve mechanism 15, and may be electrically coupled to the battery cover 14. For example, the anode lead 26 may be attached to the battery can 11, and may be electrically coupled to the battery can 11.

[Cathode]

The cathode 21 may include, for example, a cathode active material layer 21B on both surfaces of a cathode current collector 21A as illustrated in FIG. 2. Alternatively, the cathode active material layer 21B may be provided on only a single surface of the cathode current collector 21A.

The cathode current collector 21A may contain, for example, one or more of conductive materials. The kind of the conductive material is not particularly limited, but may be, for example, a metal material such as aluminum (Al), nickel (Ni), and stainless steel. The cathode current collector 21A may be configured of a single layer, or may be configured of multiple layers.

The cathode active material layer 21B contains, as a cathode active material, one or more of cathode materials that has ability to insert and extract lithium. Moreover, the cathode active material layer 21B may further contain one or more of other materials such as an anode binder and an anode conductor.

The cathode material may be preferably a lithium-containing compound. More specifically, the cathode material may be preferably one or both of a lithium-containing composite oxide and a lithium-containing phosphate compound, which makes it possible to achieve high energy density.

The lithium-containing composite oxide is an oxide that contains lithium and one or more elements excluding lithium (hereinafter, referred to as "other elements") as constituent elements, and may have, for example, a crystal structure such as a layered rock-salt crystal structure and a spinel crystal structure. The lithium-containing phosphate compound refers to a phosphate compound that contains lithium and one or more of the other elements as constituent elements, and may have, for example, a crystal structure such as an olivine crystal structure.

The kinds of the other elements are not particularly limited, as long as the other elements are one or more of any elements. In particular, the other elements may be preferably one or more of elements that belongs to Groups 2 to 15 in the long form of the periodic table of the elements. More specifically, the other elements may more preferably include one or more metal elements of nickel (Ni), cobalt (Co), manganese (Mn), and iron (Fe), which make it possible to obtain a high voltage.

In particular, the lithium-containing composite oxide having the layered rock-salt crystal structure may be preferably one or more of compounds represented by the following respective formulas (21) to (23).

$$Li_aMn_{(1-b-c)}Ni_bM11_cO_{(2-d)}F \quad (21)$$

where M11 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy $0.8 \le a \le 1.2$, $0 < b < 0.5$, $0 \le c \le 0.5$, $(b+c) < 1$, $-0.1 \le d \le 0.2$, and $0 \le e \le 0.1$, it is to be noted that the composition of lithium varies depending on charge and discharge states, and "a" is a value in a completely-discharged state.

$$Li_aNi_{(1-b)}M12_bO_{(2-c)}F_d \quad (22)$$

where M12 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0.005 \le b \le 0.5$, $-0.1 \le c \le 0.2$, and $0 \le d \le 0.1$, it is to be noted that the composition of lithium varies depending on charge and discharge states, and "a" is a value in a completely-discharged state.

$$Li_aCo_{(1-b)}M13_bO_{(2-c)}F_d \quad (23)$$

where M13 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0 \le b \le 0.5$, $-0.1 \le c \le 0.2$, and $0 \le d \le 0.1$, it is to be noted that the composition of lithium varies depending on charge and discharge states, and "a" is a value in a completely-discharged state.

Non-limiting specific examples of the lithium-containing composite oxide having the layered rock-salt crystal structure may include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

It is to be noted that in a case in which the lithium-containing composite oxide having the layered rock-salt crystal structure contains, as constituent elements, nickel, cobalt, manganese, and aluminum, an atomic ratio of nickel may be preferably 50 at % or more, which makes it possible to achieve high energy density.

The lithium-containing composite oxide having the spinel crystal structure may be, for example, a compound represented by the following formula (24).

$$Li_aMn_{(2-b)}M14_bO_cF_d \quad (24)$$

where M14 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.9 \le a \le 1.1$, $0 \le b \le 0.6$, $3.7 \le c \le 4.1$, and $0 \le d \le 0.1$, it is to be noted that the composition of lithium varies depending on charge and discharge states, and "a" is a value in a completely-discharged state.

Non-limiting specific examples of the lithium-containing composite oxide having the spinel crystal structure may include $LiMn_2O_4$.

The lithium-containing phosphate compound having the olivine crystal structure may be, for example, a compound represented by the following formula (25).

$$Li_aM15PO_4 \quad (25)$$

where M15 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies $0.9 \le a \le 1.1$, it is to be noted that the composition of lithium varies depending on charge and discharge states, and "a" is a value in a completely-discharged state.

Non-limiting specific examples of the lithium-containing phosphate compound having the olivine crystal structure may include $LiFePO_4$, $LiMnPO_4$, $LiFe_{0.5}Mn_{0.5}PO_4$, and $LiFe_{0.3}Mn_{0.7}PO_4$.

It is to be noted that the lithium-containing composite oxide may be a compound represented by the following formula (26).

$$(Li_2MnO_3)_x(LiMnO_2)_{1-x} \quad (26)$$

where "x" satisfies $0 \le x \le 1$, it is to be noted that the composition of lithium varies depending on charge and discharge states, and "x" is a value in a completely-discharged state.

In addition, the cathode material may be, for example, one or more of an oxide, a disulfide, a chalcogenide, and a conductive polymer. Non-limiting examples of the oxide may include titanium oxide, vanadium oxide, and manganese dioxide. Non-limiting examples of the disulfide may include titanium disulfide and molybdenum sulfide. Non-limiting examples of the chalcogenide may include niobium selenide. Non-limiting examples of the conductive polymer may include sulfur, polyaniline, and polythiophene. However, the cathode material may be a material other than the foregoing materials.

It is to be noted that details of the cathode binder and the cathode conductor are described later.

[Anode]

The anode 22 may include an anode active material layer 22B on both surfaces of an anode current collector 22A. Alternatively, the anode active material layer 22B may be provided on only a single surface of the anode current collector 22A.

The anode current collector 22A may contain, for example, one or more of conductive materials. The kind of the conductive material is not particularly limited, but may be, for example, a metal material such as copper (Cu), aluminum (Al), nickel (Ni), and stainless steel. The anode current collector 22A may be configured of a single layer, or may be configured of multiple layers.

A surface of the anode current collector 22A may be preferably roughened. This makes it possible to improve adhesibility of the anode active material layer 22B with respect to the anode current collector 22A by a so-called anchor effect. In this case, it may be only necessary to roughen the surface of the anode current collector 22A at least in a region facing the anode active material layer 22B. Non-limiting examples of a roughening method may include a method of forming fine particles with use of electrolytic treatment. Through the electrolytic treatment, the fine particles are formed on the surface of the anode current collector 22A in an electrolytic bath by an electrolytic method to make the surface of the anode current collector 22A rough. A copper foil fabricated by the electrolytic method is generally called "electrolytic copper foil."

The anode active material layer 22B contains, as an anode active material, one or more of anode materials that have ability to insert and extract lithium. Moreover, the anode active material layer 22B may further contain one or more of other materials such as an anode binder and an anode conductor.

In order to prevent lithium from being unintentionally precipitated on the anode 22 in the middle of charge, chargeable capacity of the anode material may be preferably larger than discharge capacity of the cathode 21. In other words, electrochemical equivalent of the anode material that has ability to insert and extract lithium may be preferably larger than electrochemical equivalent of the cathode 21.

The anode material contains a carbon material and silicon oxide together for the following four reasons.

First, the carbon material causes extremely small change in a crystal structure thereof during charge and discharge, which makes it possible to stably achieve high energy density. Further, the carbon material also serves as an anode conductor, which improves conductivity of the anode active material layer 22B.

Second, theoretical capacity of silicon (Si) contained as a constituent element in silicon oxide is higher than theoretical capacity of the carbon material, which makes it possible to achieve higher energy density. Further, silicon oxide is more resistant to deterioration than silicon (a simple substance). Accordingly, it is possible to achieve high discharge capacity from an initial cycle of charge and discharge, and discharge capacity is less prone to decrease even if charge and discharge are repeated.

Third, a multiple advantage is achieved by a combination of the carbon material and silicon oxide. More specifically, silicon oxide has a concern that silicon oxide is easily and radically expanded or contracted when the secondary battery is charged or discharged, whereas silicon oxide has an advantage of high theoretical capacity as described above. In contrast, the carbon material has an advantage that the carbon material is less likely to be expanded or contracted when the secondary battery is charged or discharged, whereas the carbon material has a concern of low theoretical capacity. Hence, using both the carbon material and the metal-based material makes it possible to suppress expansion and contraction during charge and discharge of the secondary battery while achieving high theoretical capacity.

Fourth, the electrolytic solution contains an unsaturated cyclic carbonate ester to be described later, and it is therefore considered that even if charge and discharge are repeated, a synergistic effect of the carbon material and silicon oxide makes it possible to specifically suppress decomposition reaction of the electrolytic solution while using high-reactive silicon oxide. Accordingly, while extremely high energy density is achieved, discharge capacity is less prone to decrease even if charge and discharge are repeated.

However, in order to achieve the foregoing advantages, it is necessary to have an appropriate mixture ratio of the carbon material and silicon oxide so as to prevent a content of silicon oxide from being too large.

More specifically, a weight ratio (%) of silicon oxide with respect to a total of the carbon material and silicon oxide is within a range of 0.01% to 20% both inclusive. The weight ratio (%) is calculated by [a weight of silicon oxide/(a weight of the carbon material+the weight of silicon oxide)]× 100, as described above.

It is to be noted that, as described later, the anode conductor may contain a carbon material in some cases as with the anode active material. In this case, the "weight of the carbon material" for calculation of the foregoing weight ratio is a total of a weight of the carbon material that is the anode active material and a weight of the carbon material that is the anode binder. It goes without saying that, in a case in which a carbon material is further contained in addition to the carbon materials contained in the anode active material and the anode conductor, a weight of the carbon material is also included in the foregoing "weight of the carbon material".

A procedure of calculating the weight ratio is as follows. First, a secondary battery is disassembled in an inert atmosphere, and the anode 22 is taken out of the secondary battery, and thereafter, the anode active material layer 22B is peeled from the anode current collector 22A. The inert atmosphere may be, for example, an atmosphere of an inert gas such as argon (Ar) gas, in which the anode 22 is less likely to contact, for example, water and oxygen. Subsequently, the anode active material layer 22B is dissolved in, for example, an organic solvent to collect the anode active material contained in the anode active material layer 22B. Thereafter, a weight of the collected anode active material is measured. In this case, a soluble component such as the anode binder is dissolved and removed with use of, for example, N-methyl-2-pyrrolidone as an organic solvent. Subsequently, the weight of the carbon material contained in the anode active material is measured with use of, for example, a combustion method. Subsequently, kinds and ratios of elements contained in the anode active material are specified with use of, for example, ICP optical emission spectrometry and ICP mass spectrometry utilizing inductively coupled plasma (ICP) to determine the ratio of silicon. In this case, a binding state of silicon and oxygen (a value "x" in SiOx to be described later, i.e., an oxidized state) is examined with use of, for example, X-ray photoelectron spectroscopy (XPS or ESCA). Thus, the composition of silicon oxide is specified, and the weight of the silicon oxide is calculated. It is to be noted that in order to determine the weight of silicon oxide, a residue of the anode active material used to determine the weight of the carbon material may be used, or the anode active material collected separately from the residue may be used. Lastly, the weight ratio is calculated on the basis of the weight of the carbon material and the weight of silicon oxide.

It is to be noted that in order to determine the weight of the carbon material and the weight of the silicon oxide, for example, the weight of the anode active material may be measured, and thereafter, the anode active material may be subjected to elemental analysis with use of an energy dispersive X-ray spectrometry (EDX) method. In this case, the weight ratio of respective elements in the anode active material is specified, which makes it possible to specify the weight of the carbon material and the weight of silicon oxide on the basis of the weight ratio.

In a case in which the anode binder or/and any other material are mixed in the anode active material that is collected here, the weights of the anode binder or/and the other material may be preferably subtracted from the weight of the anode active material. To give an example, in a case in which the anode binder is mixed in the anode active material, for example, a ratio (weight) of the anode binder may be estimated on the basis of, for example, change of a weight loss curve relative to a glass transition temperature Tg.

It is to be noted that in a case in which a non-facing region that does not face the anode active material layer 22B exists, the weight of the carbon material and the weight of silicon oxide in the non-facing region may be preferably determined. The non-facing region is not involved in charge-discharge reaction; therefore, physical and chemical states of the anode active material layer 22B are easily maintained in the non-facing region. Accordingly, it is possible to measure the weight of the carbon material and the weight of silicon oxide without an influence of charge-discharge reaction.

The carbon material may be, for example, one or more of graphitizable carbon, nongraphitizable carbon, and graphite. It is to be noted that a spacing of (002) plane in the nongraphitizable carbon may be preferably 0.37 nm or larger, and a spacing of (002) plane in the graphite may be preferably 0.34 nm or smaller. More specific examples of the carbon material may include pyrolytic carbons, cokes, glassy carbon fibers, an organic polymer compound fired body, activated carbon, and carbon blacks. Non-limiting examples of the cokes may include pitch coke, needle coke, and petroleum coke. The organic polymer compound fired body is a material that is obtained by firing (carbonizing) a polymer compound such as phenol resin and furan resin. The firing may be performed at any appropriate temperature. Other than the materials mentioned above, the carbon material may be low crystalline carbon that is subjected to heat treatment at a temperature of about 1000° C. or lower, or may be amorphous carbon. It is to be noted that a shape of the carbon material may be any of a fibrous shape, a spherical shape, a granular shape, and a scale-like shape.

In particular, the carbon material may be preferably graphite, which is superior in affinity for silicon oxide. Accordingly, a higher effect is achievable.

It is to be noted that part of the carbon material may be preferably pulverized. More specifically, it may be preferable that part of powder (spherical) carbon material be pulverized so that the carbon material contains a mixture of an unpulverized (large particle diameter) carbon material and a pulverized (small particle diameter) carbon material. This allows for an improvement in filling property of the carbon material, thereby improving energy density per unit volume. It is to be noted that the particle diameter described here is a median system (D50: μm).

Silicon oxide has a composition represented by $SiO_x$ (x>0). The kind of the silicon oxide is not particularly limited, as long as the silicon oxide is one or more of compounds represented by $SiO_x$ (x>0).

In particular, the silicon oxide may preferably have a composition represented by $SiO_x$ (0<x<2), and "x" that determines the composition may more preferably satisfy $0.5 \leq x \leq 1.5$, which makes it possible to achieve appropriate balance between energy density and deterioration resistance, thereby achieving a higher effect.

An average particle diameter (μm) and a specific surface area (m²/g) of the silicon oxide are not particularly limited. The average particle diameter is a so-called median diameter (D50). In particular, the average particle diameter may be preferably within a range of 0.1 μm to 10 μm both inclusive, and the specific surface area may be preferably with in a range of 1 m²/g to 10 m²/g both inclusive, which make it possible to achieve a higher effect. It is to be noted that the average particle diameter may be measured by, for example, a laser scattering particle distribution analyzer (LA-920) manufactured from Horiba, Ltd. The specific surface area may be measured by, for example, a typical nitrogen absorption method. More specifically, the specific surface area may be measured with use of an automatic specific surface area analyzer "Micromeritics TirStar" manufactured from Shimadzu Corporation.

It is to be noted that the anode material may further contain one or more of other materials in addition to the foregoing carbon material and the forgoing silicon oxide.

Examples of the other materials may include a material containing one or more of metal elements and metalloid elements (hereinafter referred to as "metal-based material"), which makes it possible to achieve high energy density. However, the foregoing silicon oxide is excluded from the metal-based material described here.

The metal-based material may be any of a simple substance, an alloy, or a compound, may be two or more thereof, or may have one or more phases thereof at least in part. It is to be noted that the "alloy" also encompasses a material that contains one or more metal elements and one or more metalloid elements, in addition to a material that is configured of two or more metal elements. Further, the "alloy" may contain a nonmetallic element. Non-limiting examples of a structure of the metal-based material may include a solid solution, a eutectic crystal (a eutectic mixture), an intermetallic compound, and a structure in which two or more thereof coexist.

The metal elements and the metalloid elements mentioned above may be, for example, one or more of metal elements and metalloid elements that are able to form an alloy with lithium. Non-limiting specific examples thereof may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt).

In particular, silicon, tin, or both may be preferable. Silicon and tin have superior ability to insert and extract lithium, and achieve remarkably high energy density accordingly.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. Note that the "simple substance" described here merely refers to a simple substance in a general sense (in which a small amount of impurity may be contained), and does not necessarily refer to a simple substance having a purity of 100%.

The alloy of silicon may contain, for example, one or more of elements such as tin, nickel, copper, iron, cobalt, manganese, zinc, indium, silver, titanium, germanium, bismuth, antimony, and chromium, as constituent elements other than silicon. The compound of silicon may contain, for example, one or more of elements such as carbon and oxygen as constituent elements other than silicon. It is to be noted that the compound of silicon may contain, for example, one or more of the elements described related to the alloy of silicon, as constituent elements other than silicon.

Non-limiting specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_2$, and LiSiO.

The alloy of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen, as constituent elements other than tin. It is to be noted that the compound of tin may contain, for example, one or more of the elements described related to the alloy of tin, as constituent elements other than tin.

Non-limiting specific examples of the alloy of tin and the compound of tin may include $SnO_w$ ($0<w\leq2$), $SnSiO_3$, LiSnO, and $Mg_2Sn$.

In particular, the material containing tin as a constituent element may be preferably, for example, a material (Sn-containing material) that contains, together with tin as a first constituent element, a second constituent element and a third constituent element. The second constituent element may be, for example, one or more of elements such as cobalt (Co), iron (Fe), magnesium (Mg), titanium (Ti), vanadium (V), chromium (Cr), manganese (Mn), nickel (Ni), copper (Cu), zinc (Zn), gallium (Ga), zirconium (Zr), niobium (Nb), molybdenum (Mo), silver (Ag), indium (In), cesium (Ce), hafnium (Hf), tantalum (Ta), tungsten (W), bismuth (Bi), and silicon (Si). The third constituent element may be, for example, one or more of elements such as boron (B), carbon (C), aluminum (Al), and phosphorus (P). Containing the second constituent element and the third constituent element makes it possible to achieve, for example, but not limited to, high battery capacity and superior cycle characteristics.

In particular, a Sn-containing material may preferably a material (a SnCoC-containing material) that contains tin, cobalt, and carbon as constituent elements. In the SnCoC-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The SnCoC-containing material may preferably have a phase that contains tin, cobalt, and carbon. Such a phase may be preferably low crystalline or amorphous. This phase is a reaction phase that is able to react with lithium. Hence, existence of the reaction phase results in achievement of superior characteristics. A half width (a diffraction angle 2θ) of a diffraction peak obtained by X-ray diffraction of this reaction phase may be preferably 1° or larger in a case in which a CuKα ray is used as a specific X-ray, and an insertion rate is 1°/min. This makes it possible to insert and extract lithium more smoothly, and to decrease reactivity with the electrolytic solution. It is to be noted that, in some cases, the SnCoC-containing material may include a phase that contains simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of 2θ that is from 20° to 50° both inclusive. Such a reaction phase may include, for example, the respective constituent elements mentioned above, and it may be considered that such a reaction phase has become low crystalline or amorphous mainly because of existence of carbon.

In the SnCoC-containing material, part or all of carbon that is the constituent element thereof may be preferably bound to a metal element or a metalloid element that is another constituent element thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al-Kα ray or a Mg-Kα ray may be used as a soft X-ray. In a case in which part or all of carbon is bound to a metal element, a metalloid element, or another element, a peak of a synthetic wave of is orbit of carbon (Cis) appears in a region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. The two peaks may be therefore separated from each other, for example, by analysis with use of commercially-available software. In the analysis of the waveform, a position of the main peak that exists on the lowest bound energy side is regarded as the energy standard (284.8 eV).

It is to be noted that the SnCoC-containing material is not limited to a material (SnCoC) that contains only tin, cobalt, and carbon as constituent elements. The SnCoC-containing material may further contain, for example, one or more of elements such as silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements may be also preferable. Any composition of the SnCoFeC-containing material may be adopted. To give an example, in a case in which a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case in which the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical characteristics (such as a half width) of the SnCoFeC-containing material are similar to physical characteristics of the foregoing SnCoC-containing material.

Other than the materials mentioned above, the other materials may be, for example, a metal oxide and a polymer compound. Non-limiting examples of the metal oxide may include iron oxide, ruthenium oxide, and molybdenum oxide. Non-limiting examples of the polymer compound may include polyacetylene, polyaniline, and polypyrrole. However, the other material may be a compound other than the compound mentioned above.

The anode binder may contain, for example, one or more of synthetic rubbers and polymer materials. Non-limiting examples of the synthetic rubbers may include a styrene-butadiene-based rubber, a fluorine-based rubber, and ethylene propylene diene. Non-limiting examples of the polymer materials may include polyvinylidene fluoride, polyimide, polyamide imide, polytetrafluoroethylene, polyacrylonitrile, carboxymethyl cellulose, polyacrylic acid, a copolymer of two or more kinds thereof.

The anode conductor may contain, for example, one or more of carbon materials. Non-limiting examples of the carbon materials may include graphite, carbon black, acetylene black, Ketjen black, and carbon nanotubes. In particular, the anode conductor may preferably contain a carbon material having a fibrous shape such as carbon nanotubes, which remarkably improves conductivity of the anode 22. It is to be noted that the anode conductor may be a metal material, a conductive polymer, or any other material, as long as the anode conductor is a material having conductivity.

The anode active material layer 22B may be formed by, for example, one or more of a coating method, a vapor-phase method, a liquid-phase method, a spraying method, and a firing method (sintering method). The coating method may be, for example, a method in which, after a particulate (powder) anode active material is mixed with, for example, an anode binder, the mixture is dispersed in a solvent such as an organic solvent, and the resultant is applied onto the anode current collector 22A. Non-limiting examples of the vapor-phase method may include a physical deposition method and a chemical deposition method. More specifically, non-limiting examples thereof may include a vacuum evaporation method, a sputtering method, an ion plating method, a laser ablation method, a thermal chemical vapor deposition method, a chemical vapor deposition (CVD) method, and a plasma chemical vapor deposition method. Non-limiting examples of the liquid-phase method may include an electrolytic plating method and an electroless plating method. The spraying method is a method in which an anode active material in a fused state or a semi-fused state is sprayed to the anode current collector 22A. The firing method may be, for example, a method in which, after the mixture dispersed in the solvent is applied onto the anode current collector 22A by the coating method, the resultant is subjected to heat treatment at a temperature higher than a melting point of, for example, the anode binder. For example, one or more of an atmosphere firing method, a reactive firing method, a hot press firing method, and other firing methods may be employed as the firing method.

Volume density (g/cm$^3$) of the anode active material layer 22B in a completely-charged state here is not particularly limited, but, in particular, may be preferably within a range of 0.8 g/cm$^3$ to 1.55 g/cm$^3$ both inclusive, which makes it possible to achieve higher effect.

It is to be noted that the foregoing completely-charged state means a state in which a secondary battery is charged to an upper-limit voltage under standard charge conditions directed by product specifications of a lithium-ion secondary battery (a single cell).

The charge conditions are not particularly limited, as long as the charge conditions conform to the foregoing standard charge conditions. However, a potential (versus a lithium counter electrode) of the anode 22 after completion of charge is 0.2 V or less. An example of specific charge conditions is described below. The secondary battery is charged at a current of 0.5 C until the voltage reaches the upper-limit voltage, and thereafter, the secondary battery is charged at the upper-limit voltage until the current reaches 0.05 C. The upper-limit voltage is not particularly limited, but the upper-limit voltage may be preferably within a range of 4.2 V to 4.4 V both inclusive, and more preferably 4.35 V. The potential (versus the lithium counter electrode) of the anode 22 after completion of charge is as described above. It is to be noted that the "0.5 C" refers to a current value at which the battery capacity is completely discharged in 2 hours, and the "0.05 C" refers to a current value at which the battery capacity is completely discharged in 20 hours.

A procedure of calculating the volume density may be as follows, for example. First, the secondary battery in a completely-charged state is disassembled in an inert atmosphere to take the anode 22 out of the secondary battery. Details of the inert atmosphere are as described above. Subsequently, the anode 22 in the completely charge state is cut with use of, for example, a microtome, and thereafter, a thickness (cm) of the anode active material layer 22B in a cross-section of the anode 22 is measured. Subsequently, a weight (g) of the anode active material per unit area (cm$^2$) of the anode active material layer 22B is measured to determine area density (g/cm$^2$). Lastly, the volume density (g/cm$^3$)=the area density (g/cm$_2$)/the thickness (cm) is determined from the thickness and the area density mentioned above.

In a case in which, in a state in which the cathode 21 and the anode 22 face each other with the separator 23 in between, a formation region of the anode active material layer 22B is wider than a formation region of the cathode active material layer 21B, part (non-facing region) of the anode active material layer 22B does not face the cathode active material layer 21B. The non-facing region is not involved in charge-discharge reaction; therefore, the physical and chemical states of the anode active material layer 22B tend to be easily maintained in the non-facing region. Accordingly, in order to determine the foregoing volume density, the area density in the non-facing region may be preferably determined.

It is to be noted that, for example, in a case in with the non-facing region does not exist, the area density may be determined, for example, on the basis of capacity of the anode 22 or on the basis of composition analysis of the anode active material layer 22B.

[Separator]

The separator 23 separates the cathode 21 from the anode 22, and passes lithium ions therethrough while preventing current short circuit that results from contact between the cathode 21 and the anode 22. The separator 23 may be, for example, a porous film that is made of, for example, a synthetic resin or ceramics. The separator 23 may be a laminated film in which two or more porous films are laminated. Non-limiting examples of the synthetic resin may include polytetrafluoroethylene, polypropylene, and polyethylene.

In particular, the separator 23 may include, for example, the foregoing porous film (a base material layer), and a polymer compound layer provided on a single surface or both surfaces of the base material layer. This allows for an improvement in adhesibility of the separator 23 with respect to each of the cathode 21 and the anode 22, thereby suppressing deformation of the spirally wound electrode body 20. This makes it possible to suppress decomposition reaction of the electrolytic solution and to suppress liquid leakage of the electrolytic solution with which the base material layer is impregnated. Accordingly, resistance is less prone to increase even if charge and discharge are repeated, and battery swollenness is suppressed.

The polymer compound layer may contain, for example, one or more of polymer materials such as polyvinylidene fluoride. Such polymer materials are superior in physical strength and electrochemically stable. However, the polymer material is not limited to polyvinylidene fluoride. When forming the polymer compound layer, for example, a solution in which the polymer material is dissolved is prepared, and thereafter, the solution is applied onto the base material layer, and the base material layer is subsequently dried. Alternatively, the base material layer may be immersed in the solution and may be subsequently dried.

[Electrolytic Solution]

The electrolytic solution contains one or more of unsaturated cyclic carbonate esters. The unsaturated cyclic carbonate ester is a cyclic carbonate ester having one or more unsaturated bonds (carbon-carbon double bonds), as described above. It is to be noted that the unsaturated cyclic carbonate ester is one kind of nonaqueous solvent, and the electrolytic solution containing the nonaqueous solvent is therefore a so-called nonaqueous electrolytic solution.

The kind of the unsaturated cyclic carbonate ester is not particularly limited, as long as the unsaturated cyclic carbonate ester is one or more of cyclic carbonate esters having one or more unsaturated bonds.

The electrolytic solution contains the unsaturated cyclic carbonate ester for the following reason. When the carbon material and silicon oxide coexist under existence of the unsaturated cyclic carbonate ester, the synergistic effect of the carbon material and silicon oxide achieves a specific advantage, as described above. More specifically, a coating film derived from the unsaturated cyclic carbonate ester is formed on a surface of the anode 22 during charge and discharge, thereby protecting the anode 22 from the electrolytic solution. Accordingly, even if charge and discharge are repeated, decomposition reaction of the electrolytic solution is specifically suppressed while using high-reactive silicon oxide. Thus, while extremely high energy density is achieved, discharge capacity is less prone to decrease even if charge and discharge are repeated.

The unsaturated cyclic carbonate ester may preferably contain one or more of a compound represented by the following formula (1), a compound represented by the following formula (2), and a compound represented by the following formula (3), which is easily synthesizable.

[Chem. 1]

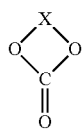

(1)

where X is a divalent group in which m-number of >C=CR1R2 and n-number of >CR3R4 are bound in any order, each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group in which two or more kinds thereof are bound, any two or more of R1 to R4 are optionally bound to each other, m is an integer satisfying m≥1, and n is an integer satisfying n≥0.

[Chem. 2]

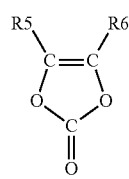

(2)

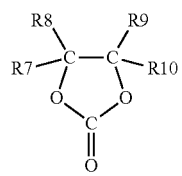

(3)

where each of R5 and R6 is one of a hydrogen group and a monovalent saturated hydrocarbon group, each of R7 to R10 is one of a hydrogen group, a monovalent saturated hydrocarbon group, and a monovalent unsaturated hydrocarbon group, and one or more of R7 to R10 are the monovalent unsaturated hydrocarbon group.

Hereinafter, the compound represented by the formula (1) is referred to as "first unsaturated cyclic carbonate ester", the compound represented by the formula (2) is referred to as "second unsaturated cyclic carbonate ester", and the compound represented by the formula (3) is referred to as "third unsaturated cyclic carbonate ester". Moreover, the first unsaturated cyclic carbonate ester, the second unsaturated cyclic carbonate ester, and the third unsaturated cyclic carbonate ester are collectively referred to as "unsaturated cyclic carbonate ester" on as-necessary basis.

The first unsaturated cyclic carbonate ester is a methylene carbonate-based compound.

X in the formula (1) is a group in which m-number of >C=CR1R2 and n-number of >CR3R4 are bound to be divalent as a whole (one atomic bonding exists on each of both ends). Groups that are adjacent (bound) to each other may be groups of a same kind such as >C=CR1R2 or groups of different kinds such as >C=CR1R2 and >CR3R4. In other words, each of the number (m) of >C=CR1R2 and the number (n) of >CR3R4 that are used to form a divalent group is any number, and these groups may be bound in any order.

>C=CR1R2 is a divalent unsaturated group that has a carbon-carbon double bond, whereas >CR3R4 is a divalent saturated group that does not have a carbon-carbon double bond. Since n≥0 is established, >CR3R3 that is a saturated group may be contained in X, or may not be contained in X. In contrast, since m≥1 is established, one or more >C=CR1R2 that are unsaturated groups are contained in X. Accordingly, X may be configured of only >C=CR1R2, or may be configured of both >C=CR1R2 and >CR3R4. The first unsaturated cyclic carbonate ester necessarily has one or more unsaturated groups.

The values m and n are not particularly limited, as long as the values m and n are integers satisfying m≥1 and n≥0. In particular, in a case in which >C=CR1R2 is >C=CH$_2$, and >CR3R4 is >CH$_2$, (m+n)≤5 may be preferably satisfied, which prevents the number of carbon atoms in X from being too large. Accordingly, solubility and compatibility of the first unsaturated cyclic carbonate ester are secured.

It is to be noted that any two or more of R1 to R4 may be bound to one another, and the bound groups may form a ring. To give an example, R1 and R2 may be bound, R3 and R4 may be bound, or R2, and R3 or R4 may be bound.

Details of R1 to R4 are as follows. Note that R1 to R4 may be groups of a same kind or groups of different kinds. Any two or more of R1 to R4 may be groups of a same kind.

The kinds of R1 to R4 are not particularly limited, as long as each of R1 to R4 is one or more of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group in which two or more kinds thereof are bound. X having one or more carbon-carbon double bonds (>C=CR1R2) makes it possible to achieve the foregoing advantages independently of the kinds of R1 to R4.

The halogen group may be, for example, one of a fluorine group (—F), a chlorine group (—Cl), a bromine group (—Br), and an iodine group (—I). In particular, the fluorine group may be preferable, which makes it possible to achieve a higher effect.

The monovalent hydrocarbon group is a generic name for a monovalent group configured of carbon (C) and hydrogen (H), and may have a straight-chain structure or a branched structure with one or more side chains. The monovalent hydrocarbon group may be, for example, one of an alkyl group having 1 to 12 carbon atoms, an alkenyl group having 2 to 12 carbon atoms, an alkynyl group having 2 to 12 carbon atoms, an aryl group having 6 to 18 carbon atoms, and a cycloalkyl group having 3 to 18 carbon atoms, which makes it possible to achieve the foregoing advantages while securing, for example, but not limited to, solubility and compatibility.

Non-limiting specific examples of the alkyl group may include a methyl group (—CH$_3$), an ethyl group (—C$_2$H$_5$), and a propyl group (—C$_3$H$_7$). Non-limiting specific examples of the alkenyl group may include a vinyl group (—CH=CH$_2$) and an allyl group (—CH$_2$—CH=CH$_2$). Non-limiting specific examples of the alkynyl group may include an ethynyl group (—C≡CH). Non-limiting specific examples of the aryl group may include a phenyl group and a naphthyl group. Non-limiting specific examples of the cycloalkyl group may include a cyclopropyl group, a cyclobutyl group, a cyclopentyl group, a cyclohexyl group, a cycloheptyl group, and a cyclooctyl group.

The monovalent oxygen-containing hydrocarbon group is a generic name for a monovalent group containing carbon, hydrogen, and oxygen (O), and may be, for example, an alkoxy group having 1 to 12 carbon atoms, which makes it possible to achieve the foregoing advantage while securing, for example, but not limited to, solubility and compatibility. Non-limiting specific examples of the alkoxy group may include a methoxy group (—OCH$_3$) and an ethoxy group (—OC$_2$H$_5$).

The monovalent halogenated hydrocarbon group is a group in which one or more hydrogen groups (—H) in the foregoing monovalent hydrocarbon group are substituted (halogenated) by a halogen group. Likewise, the monovalent halogenated oxygen-containing hydrocarbon group is a group in which one or more hydrogen groups in the foregoing monovalent oxygen-containing hydrocarbon group are substituted by a halogen group. In both cases, details of the halogen group by which the hydrogen group is substituted are similar to the details of the foregoing halogen group.

The monovalent halogenated hydrocarbon group may be, for example, the foregoing alkyl group that is halogenated, i.e., a group in which one or more hydrogen groups in, for example, the alkyl group are substituted by a halogen group. Non-limiting specific examples of the monovalent halogenated hydrocarbon group may include a trifluoromethyl group (—CF$_3$) and a pentafluoroethyl group (—C$_2$F$_5$).

Moreover, the monovalent halogenated oxygen-containing hydrocarbon group may be, for example, a group in which one or more hydrogen groups in, for example, the foregoing alkoxy group are substituted by a halogen group. Non-limiting specific examples of the monovalent halogenated oxygen-containing hydrocarbon group may include a trifluoromethoxy group (—OCF$_3$) and a pentafluethoxy group (—OC$_2$F$_5$).

The group in which two or more kinds are bound related to the monovalent hydrocarbon group is a group in which two or more kinds of the foregoing groups such as the alkyl group having 1 to 12 carbon atoms are bound to be monovalent as a whole. Non-limiting examples of the group may include a group in which an alkyl group and an aryl group are bound, and a group in which an alkyl group and a cycloalkyl group are bound. More specifically, the group in which the alkyl group and the aryl group are bound may be, for example, but not limited to, a benzyl group.

The group in which two or more kinds are bound related to R1 to R4 may be, for example, a group in which two or more kinds of the foregoing monovalent hydrocarbon groups are bound to be monovalent as a whole. Non-limiting examples of the group may include a group in which an alkoxy group and an alkyl group are bound.

It is to be noted that each of R1 to R4 may be a group other than the foregoing groups. More specifically, each of R1 to R4 may be a derivative of any of the foregoing groups. The derivative is any of the group into which one or more substituent groups are introduced, and the substituent groups may be of any kind.

In particular, the first unsaturated cyclic carbonate ester may preferably contain one or both of a compound represented by the following formula (4) and a compound represented by the following formula (5), which is more easily synthesizable.

[Chem. 3]

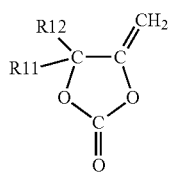

(4)

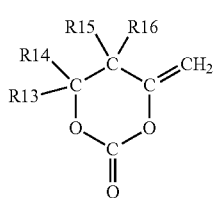
(5)

where each of R11 to R16 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group in which two or more kinds thereof are bound, R11 and R12 are optionally bound to each other, and any two or more of R13 to R16 are optionally bound to each other.

When attention is focused on a relationship between the formula (1) and the formula (4), the compound represented by the formula (4) has, as X in the formula (1), one unsaturated group ($>C=CH_2$) corresponding to $>C=CR1R2$ and one saturated group ($>CR11R12$) corresponding to $>CR3R4$. In contrast, when attention is focused on a relationship between the formula (1) and the formula (5), the compound represented by the formula (5) has, as X, one unsaturated group ($>C=CH_2$) corresponding to $>C=CR1R2$ and two saturated groups ($>CR13R14$ and $>CR15R16$) corresponding to $>CR3R4$. Note that the one unsaturated group and the two saturated groups are bound in order of $>CR13R14$, $>CR15R16$, and $>C=CH_2$.

Details of R11 and R12 in the formula (4) and details of R13 to R16 in the formula (5) are similar to details of R1 to R4 in the formula (1).

Non-limiting specific example of the first unsaturated cyclic carbonate ester here may include compounds represented by the following respective formulas (1-1) to (1-56), which include geometric isomers. Note that specific examples of the first unsaturated cyclic carbonate ester may include a compound other than the foregoing compounds.

[Chem. 4]

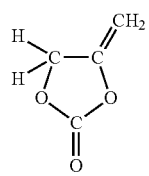
(1-1)

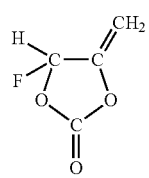
(1-2)

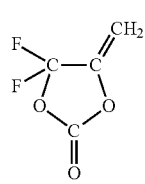
(1-3)

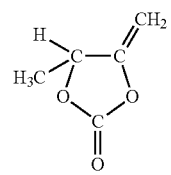
(1-4)

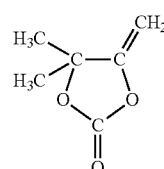
(1-5)

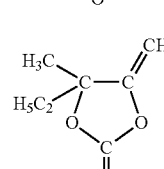
(1-6)

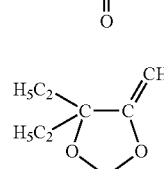
(1-7)

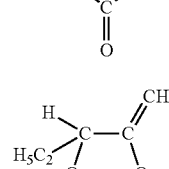
(1-8)

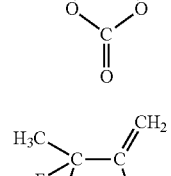
(1-9)

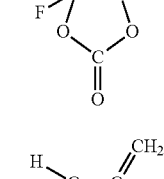
(1-10)

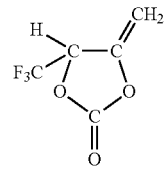
(1-11)

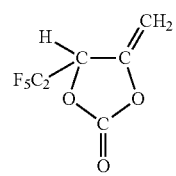

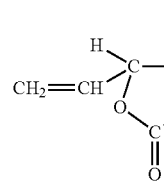
(1-12)

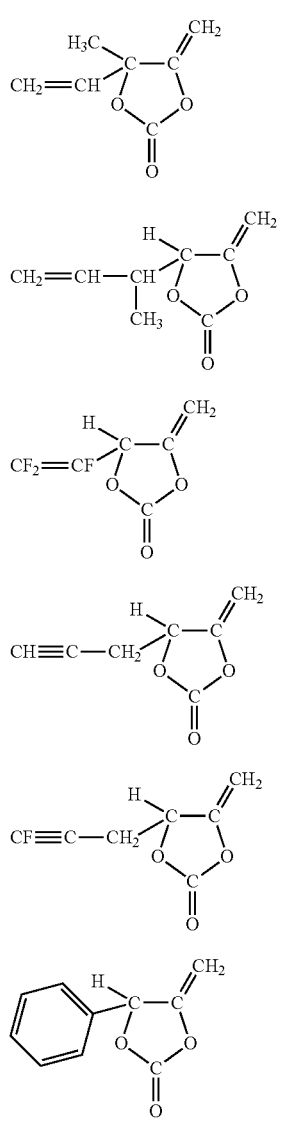
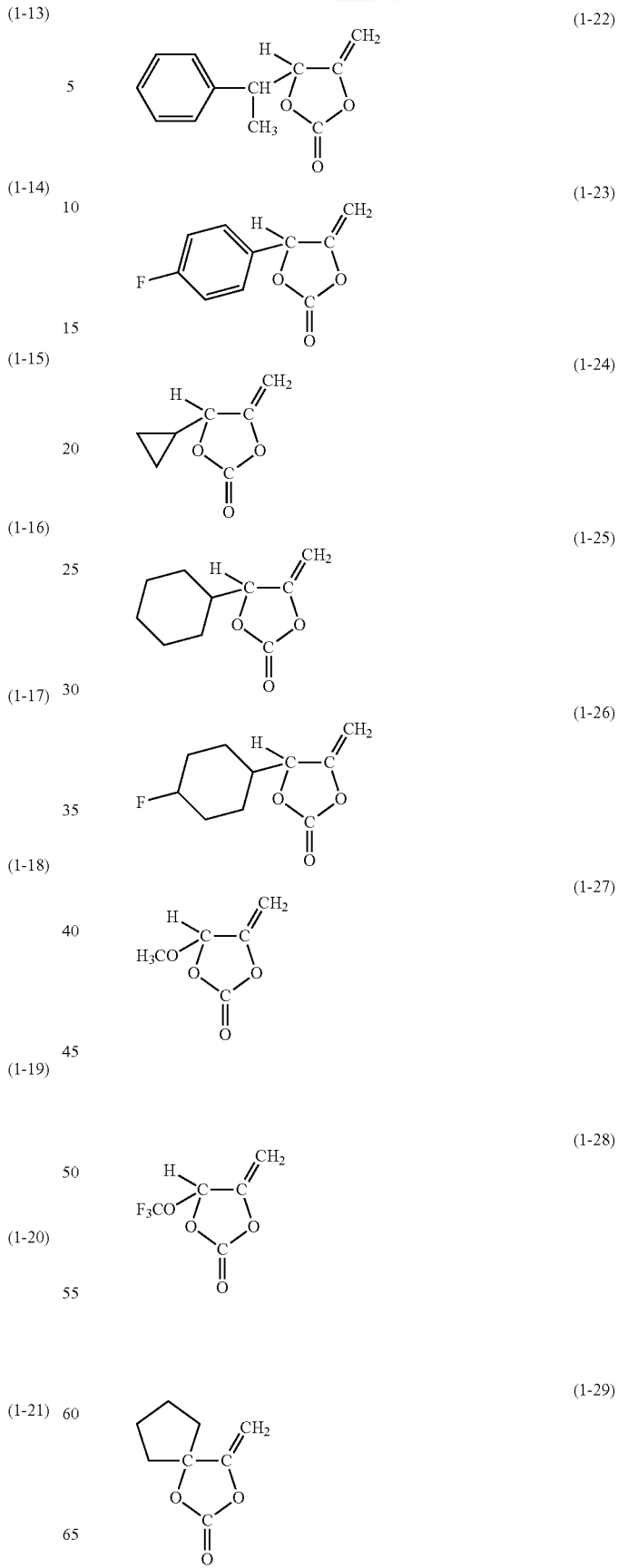

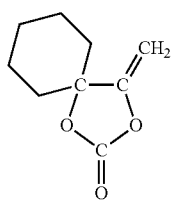 (1-30)
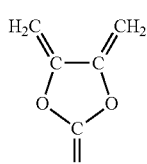 (1-31)
[Chem. 6]
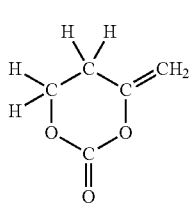 (1-32)
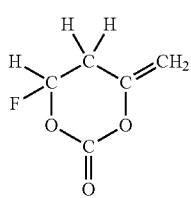 (1-33)
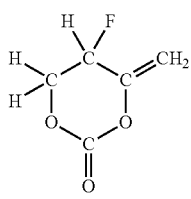 (1-34)
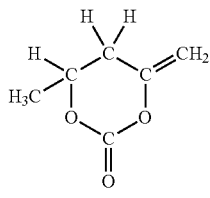 (1-35)
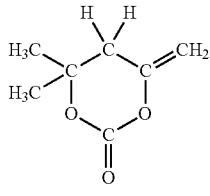 (1-36)
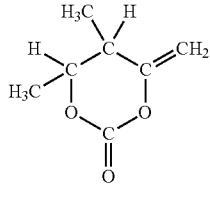 (1-37)
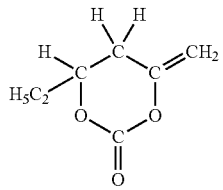 (1-38)
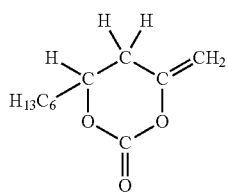 (1-39)
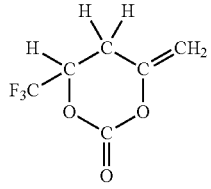 (1-40)
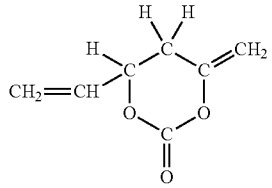 (1-41)
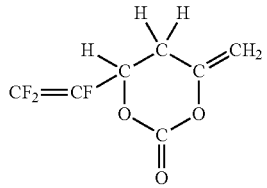 (1-42)
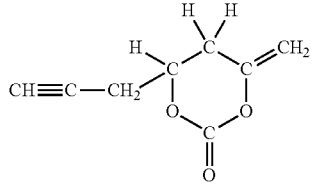 (1-43)
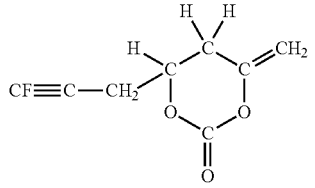 (1-44)
[Chem. 7]
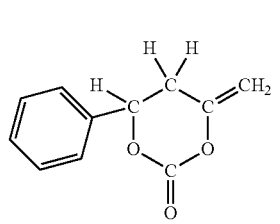 (1-45)

(1-46) 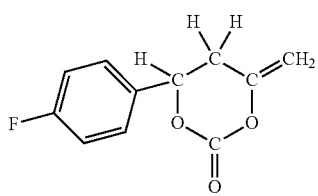

(1-47) 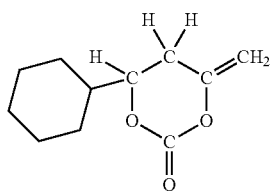

(1-48) 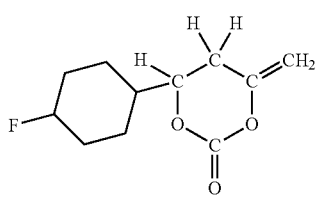

(1-49) 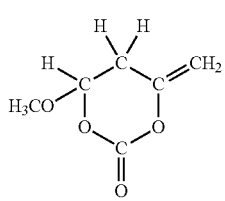

(1-50) 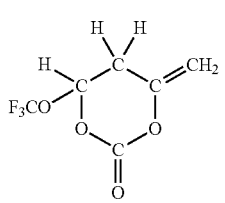

(1-51) 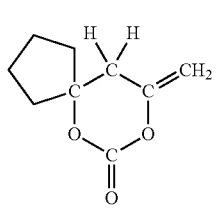

(1-52) 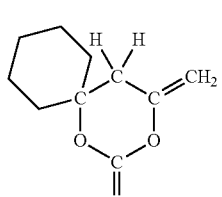

(1-53) 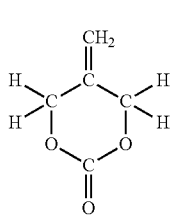

(1-54) 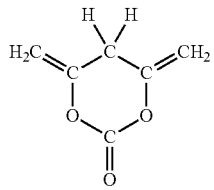

(1-55) 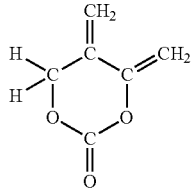

(1-56) 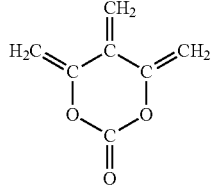

In particular, for example, the formula (1-1) corresponding to the formula (4) may be preferable, and, for example, the formula (1-32) corresponding to the formula (5) may be preferable. They make it possible to achieve a higher effect.

The second unsaturated cyclic carbonate ester is a vinylene carbonate-based compound.

R5 and R6 in the formula (2) may be groups of a same kind or groups of different kinds. The kinds of R5 and R6 are not particularly limited, as long as each of R5 and R6 is one or more of a hydrogen group and a monovalent saturated hydrocarbon group. The second unsaturated cyclic carbonate ester having a carbon-carbon double bond (—C═C<) makes it possible to achieve the foregoing advantages independently of the kinds of R5 and R6.

The monovalent saturated hydrocarbon group is a group not having an unsaturated carbon-carbon bond in the foregoing monovalent hydrocarbon group. Non-limiting specific examples of the monovalent saturated hydrocarbon group may include an alkyl group having 1 to 12 carbon atoms and a cycloalkyl group having 3 to 18 carbon atoms. In particular, the alkyl group having 1 to 12 carbon atoms may be preferable, which makes it possible to secure, for example, but not limited to, solubility and compatibility of the third unsaturated cyclic carbonate ester. Details of the alkyl group and the cycloalkyl are similar to, for example, those in a case in which the foregoing first unsaturated cyclic carbonate ester is described.

Non-limiting specific examples of the second unsaturated cyclic compound may include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-di ethyl-1,3-dioxol-2-one, 4-fluoro-1,3-dioxol-2-one, and 4-trifluoromethyl-1,3-dioxol-2-one. In particular, vinylene carbonate may be preferable, which is easily synthesizable.

The third unsaturated cyclic carbonate ester is a vinyl ethylene carbonate-based compound.

R13 to R16 in the formula (3) may be groups of a same kind or groups of different kinds. It goes without saying that some of R13 to R16 may be groups of a same kind. The kinds of R13 to R16 are not particularly limited, as long as each of R13 to R16 is one of a hydrogen group, a monovalent saturated hydrocarbon group, and a monovalent unsaturated hydrocarbon group. Note that one or more of R13 to R16 are the monovalent unsaturated hydrocarbon group. The third unsaturated cyclic carbonate ester having one or more carbon-carbon double bonds (>C=C<) makes it possible to achieve the foregoing advantages independently of the kinds of R13 to R16.

The monovalent unsaturated hydrocarbon group is a group having an unsaturated carbon-carbon bond in the foregoing monovalent hydrocarbon group. Non-limiting examples of the monovalent unsaturated hydrocarbon group may include an alkenyl group having 2 to 12 carbon atoms and an aryl group having 6 to 18 carbon atoms, and in particular, the alkenyl group having 2 to 12 carbon atoms may be preferable, which makes it possible to secure, for example, but not limited to, solubility and compatibility of the third unsaturated cyclic carbonate ester. Details of the alkenyl group and the aryl group may be similar to, for example, those in a case in which the foregoing first unsaturated cyclic carbonate ester is described.

Non-limiting specific examples of the third unsaturated cyclic compound may include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. In particular, vinyl ethylene carbonate may be preferable, which is easily synthesizable. It goes without saying that all of R13 to R16 may be vinyl groups or allyl groups, or the vinyl group and the allyl group may be mixed in R13 to R16.

In particular, the unsaturated cyclic carbonate ester may preferably contain the first unsaturated cyclic carbonate ester out of the foregoing first unsaturated cyclic carbonate ester, the foregoing second unsaturated cyclic carbonate ester, and the foregoing third unsaturated cyclic carbonate ester. This makes it possible to achieve a higher effect.

A content (wt %) of the unsaturated cyclic carbonate ester in the electrolytic solution is not particularly limited, but, in particular, may be preferably within a range of 0.01 wt % to 10 wt % both inclusive, which makes it possible to achieve a higher effect. It is to be noted that in a case in which the unsaturated cyclic carbonate ester contains two or more of the first unsaturated cyclic carbonate ester, the second unsaturated cyclic carbonate ester, and the third unsaturated cyclic carbonate ester, the foregoing "content of the unsaturated cyclic carbonate ester" is a total of contents of the two or more of them.

Accordingly, an amount of the unsaturated cyclic carbonate ester in the electrolytic solution and an amount of silicon oxide in the anode active material may preferably establish an appropriate relationship. More specifically, a ratio C/R may be preferably within a range of 0.002 to 2 both inclusive, where the content (wt %) of the unsaturated cyclic carbonate ester in the electrolytic solution is C and a weight ratio (9)% of silicon oxide with respect to a total of the carbon material and silicon oxide is R. This makes it possible to stably achieve the synergistic effect of the carbon material and silicon oxide under existence of the unsaturated cyclic carbonate ester.

It is to be noted that the electrolytic solution may contain one or more of other materials in addition to the foregoing unsaturated cyclic carbonate ester.

The other materials may be, for example, one or more of solvents such as a nonaqueous solvent. Note that the foregoing unsaturated cyclic carbonate ester is excluded from the solvent described here.

Non-limiting examples of the solvent may include a cyclic carbonate ester, a chain carbonate ester, a lactone, a chain carboxylate ester, and a nitrile, which makes it possible to achieve, for example, but not limited to, high battery capacity, superior cycle characteristics, and superior storage characteristics. Non-limiting examples of the cyclic carbonate ester may include ethylene carbonate, propylene carbonate, and butylene carbonate. Non-limiting examples of the chain carbonate ester may include dimethyl carbonate, diethyl carbonate, ethylmethyl carbonate, and methylpropyl carbonate. Non-limiting examples of the lactone may include γ-butyrolactone and γ-valerolactone. Non-limiting examples of the carboxylate ester may include methyl acetate, ethyl acetate, methyl propionate, ethyl propionate, methyl butyrate, methyl isobutyrate, methyl trimethylacetate, and ethyl trimethylacetate. Non-limiting examples of the nitrile may include acetonitrile, glutaronitrile, adiponitrile, methoxyacetonitrile, and 3-methoxypropionitrile.

In addition, non-limiting examples of the solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyl oxazolidinone, N,N'-dimethyl imidazolidinone, nitromethane, nitroethane, sulfolane, trimethyl phosphate, and dimethyl sulfoxide, which make it possible to achieve a similar advantage.

In particular, one or more of ethylene carbonate, propylene carbonate, dimethyl carbonate, diethyl carbonate, and ethylmethyl carbonate may be preferable, which make it possible to achieve, for example, but not limited to, higher battery capacity, further superior cycle characteristics, and further superior storage characteristics. In this case, a combination of a high-viscosity (high dielectric constant) solvent (having, for example, specific dielectric constant ε≥30) such as ethylene carbonate and propylene carbonate and a low-viscosity solvent (having, for example, viscosity ≤1 mPa·s) such as dimethyl carbonate, ethylmethyl carbonate, and diethyl carbonate may be more preferable. The combination allows for an improvement in the dissociation property of the electrolyte salt and ion mobility.

Moreover, non-limiting examples of the solvent may include a halogenated carbonate ester, a sulfonate ester, an acid anhydride, a dicyano compound, and a diisocyanate compound, which make it possible to improve chemical stability of the electrolytic solution.

The halogenated carbonate ester is a cyclic or chain carbonate ester containing one or more halogens as constituent elements. Non-limiting examples of the cyclic halogenated carbonate ester may include 4-fluoro-1,3-dioxolane-2-one and 4,5-difluoro-1,3-dioxolane-2-one. Non-limiting examples of the chain halogenated carbonate ester may include fluoromethyl methyl carbonate, bis(fluoromethyl) carbonate, and difluoromethyl methyl carbonate.

Non-limiting examples of the sulfonate ester may include propane sultone and propene sultone.

Non-limiting examples of the acid anhydride may include a carboxylic anhydride, a disulfonic anhydride, and a carboxylic-sulfonic anhydride. Non-limiting examples of the carboxylic anhydride may include succinic anhydride, glutaric anhydride, and maleic anhydride. Non-limiting examples of the disulfonic anhydride may include ethanedisulfonic anhydride and propanedisulfonic anhydride. Non-limiting examples of a carboxylic-sulfonic anhydride may include sulfobenzoic anhydride, sulfopropionic anhydride, and sulfobutyric anhydride.

The dicyano compound may be, for example, a compound represented by NC—$C_mH_{2m}$—CN (where m is an integer of 1 or more), and more specifically, may be, for example, but not limited to, succinonitrile (NC—$C_2H_4$—CN). The diisocyanate compound may be, for example, a compound represented by OCN—$C_nH_{2n}$—NCO (where n is an integer of 1 or more), and more specifically, may be, for example, but not limited to, hexamethylene diisocyanate (OCN—$C_6H_{12}$—NCO).

In particular, the solvent may preferably contain the cyclic halogenated carbonate ester, and may more preferably contain 4-fluoro-1,3-dioxolane-2-one. A coating film derived mainly from the cyclic halogenated carbonate ester is formed on a surface of the anode 22 during charge and discharge, thereby remarkably suppressing decomposition reaction of the electrolytic solution.

The electrolyte salt may contain, for example, one or more of salts such as lithium salt. Note that the electrolyte salt may contain any salt other than the lithium salt. Non-limiting examples of the salt other than lithium may include a salt of a light metal other than lithium.

Non-limiting examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lithium chloride (LiCl), and lithium bromide (LiBr), which make it possible to achieve, for example, but not limited to, high battery capacity, superior cycle characteristics, and superior storage characteristics.

In particular, one or more of $LiPF_6$, $LiBF_4$, $LiClO_4$, and $LiAsF_6$ may be preferable, and $LiPF_6$ may be more preferable, which makes it possible to decrease the internal resistance, thereby achieving a higher effect. Note that the electrolyte salt may be a compound (salt) other than the compounds mentioned above.

A content of the electrolyte salt is not particularly limited, but, in particular, may be preferably within a range of 0.3 mol/kg to 3.0 mol/kg both inclusive with respect to the solvent, which makes it possible to achieve high ionic conductivity.

[Operation of Secondary Battery]

The secondary battery may operate as follows, for example.

When the secondary battery is charged, lithium ions are extracted from the cathode 21, and the extracted lithium ions are inserted in the anode 22 through the electrolytic solution. In contrast, when the secondary battery is discharged, lithium ions are extracted from the anode 22, and the extracted lithium ions are inserted in the cathode 21 through the electrolytic solution.

[Method of Manufacturing Secondary Battery]

The secondary battery may be manufactured by the following procedure, for example.

When fabricating the cathode 21, first, for example, the cathode active material, the cathode binder, and the cathode conductor are mixed to obtain a cathode mixture. Subsequently, the cathode mixture is dispersed in, for example, an organic solvent to obtain paste cathode mixture slurry. Next, the cathode mixture slurry is applied onto both surfaces of the cathode current collector 21A, and thereafter, the applied cathode mixture slurry is dried to form the cathode active material layers 21B. Thereafter, the cathode active material layers 21B is compression-molded with use of, for example, a roll pressing machine, while being heated on as-necessary basis. In this case, the cathode active material layer 21B may be compression-molded a plurality of times.

When fabricating the anode 22, the anode active material layer 22B is formed on the anode current collector 22A by a similar procedure to the foregoing procedure of fabricating the cathode 21. More specifically, an anode mixture in which, for example, the anode active material containing the carbon material and silicon oxide, the anode binder, and the anode conductor are mixed is dispersed in, for example, an organic solvent to obtain paste anode mixture slurry. Next, the anode mixture slurry is applied onto both surfaces of the anode current collector 22A, and thereafter, the applied anode mixture slurry is dried to form the anode active material layer 22B. Thereafter, the anode active material layer 22B may be compression-molded with use of, for example, a roll pressing machine, while being heated, or may be compression-molded a plurality of times.

When preparing the electrolytic solution, the electrolyte salt is dissolved or dispersed in the solvent, and thereafter, the unsaturated cyclic carbonate ester is added to the solvent.

When assembling the secondary battery, the cathode lead 25 is attached to the cathode current collector 21A by, for example, a welding method, and the anode lead 26 is attached to the anode current collector 22A by, for example, a welding method. Subsequently, the cathode 21 and the anode 22 are stacked with the separator 23 in between, and the resultant stacked body is spirally wound to form the spirally wound electrode body 20. Thereafter, the center pin 24 is inserted in the center of the spirally wound electrode body 20. Subsequently, the spirally wound electrode body 20 is sandwiched between the pair of insulating plates 12 and 13, and is contained inside the battery can 11. In this case, an end tip of the cathode lead 25 is attached to the safety valve mechanism 15 by, for example, a welding method, and an end tip of the anode lead 26 is attached to the battery can 11 by, for example, a welding method. Subsequently, the electrolytic solution is injected inside the battery can 11, and the spirally wound electrode body 23 is impregnated with the injected electrolytic solution. Thereafter, the battery cover 14, the safety valve mechanism 15, and the PTC device 16 are swaged with the gasket 17 at the open end of the battery can 11.

[Action and Effects of Secondary Battery]

According to the secondary battery, the anode 22 contains the carbon material and silicon oxide, the weight ratio of the silicon oxide is within a range of 0.01% to 20% both inclusive, and the electrolytic solution contains the unsaturated cyclic carbonate ester. In this case, even if charge and discharge are repeated, the synergistic effect of the carbon material and silicon oxide makes it possible to specifically suppress decomposition reaction of the electrolytic solution while using high-reactive silicon oxide, as described above. Accordingly, while extremely high energy density is achieved, discharge capacity is less prone to decrease even if charge and discharge are repeated. This makes it possible to achieve superior battery characteristics.

In particular, when the carbon material contains graphite, and the unsaturated cyclic carbonate ester contains one or more of the first unsaturated cyclic carbonate ester, the second unsaturated cyclic carbonate ester, and the third unsaturated cyclic carbonate ester, it is possible to achieve a higher effect. In particular, the unsaturated cyclic carbonate ester containing the first unsaturated cyclic carbonate ester makes it possible to achieve a still higher effect.

Moreover, when x in the composition of silicon oxide ($SiO_x$: $0<x<2$) satisfies $0.5 \leq x \leq 1.5$, the average particle diameter (D50) of silicon oxide is within a range of 0.1 μm to 10 μm both inclusive, or the specific surface area of silicon oxide is within a range of 1 $m^2/g$ to 10 $m^2/g$ both inclusive, it is possible to achieve a higher effect.

Further, the content of the unsaturated cyclic carbonate ester in the electrolytic solution is within a range of 0.01 wt % to 10 wt % both inclusive, and the ratio C/R of the content C of the unsaturated cyclic carbonate ester and the weight ratio R of silicon oxide is within a range of 0.002 to 2 both inclusive, or the volume density of the anode 22 in a completely-charged state is within a range of 0.8 $g/cm^3$ to 1.55 $g/cm^3$ both inclusive, it is possible to achieve a higher effect.

(1-2. Lithium-Ion Secondary Battery (Laminated Film Type))

FIG. 3 illustrates a perspective configuration of another secondary battery according to an embodiment of the present technology. FIG. 4 illustrates a cross-sectional view taken along a line IV-IV of a spirally wound electrode body 30 illustrated in FIG. 3. It is to be noted that FIG. 3 illustrates a state in which the spirally wound electrode body 30 and an outer package member 40 are separated from each other. In description below, the components of the cylindrical type secondary battery that have been already described are used where appropriate.

[Whole Configuration of Secondary Battery]

The secondary battery may be, for example, a so-called laminated film type lithium-ion secondary battery. For example, the spirally wound electrode body 30 may be contained inside the film-like outer package member 40 as illustrated in FIG. 3. In the spirally wound electrode body 30, for example, a cathode 33 and an anode 34 may be stacked with a separator 35 and an electrolyte layer 36 in between, and the resultant stacked body may be spirally wound. A cathode lead 31 is attached to the cathode 33, and an anode lead 32 is attached to the anode 34. An outermost periphery of the spirally wound electrode body 30 is protected by a protective tape 37.

Each of the cathode lead 31 and the anode lead 32 may be led out from inside to outside of the outer package member 40 in a same direction, for example. The cathode lead 31 may be made of, for example, one or more of conductive materials such as aluminum. The anode lead 32 may be made of, for example, one or more of conductive materials such as copper, nickel, and stainless steel. These conductive materials may have a thin-plate shape or a mesh shape, for example.

The outer package member 40 may be, for example, one film that is foldable in a direction of an arrow R illustrated in FIG. 3, and the outer package member 40 may have a depression for containing of the spirally wound electrode body 30 in part thereof. The outer package member 40 may be a laminated film in which a fusion bonding layer, a metal layer, and a surface protective layer are laminated in this order, for example. In a process of manufacturing the secondary battery, the outer package member 40 is folded so that portions of the fusion-bonding layer face each other with the spirally wound electrode body 30 in between, and thereafter outer edges of the portions of the fusion bonding layer are fusion-bonded. Alternatively, two laminated films bonded to each other by, for example, an adhesive may form the outer package member 40. Examples of the fusion bonding layer may include a film made of one or more of polyethylene, polypropylene, and other materials. The metal layer may include, for example, one or more of an aluminum foil and other metal materials. The surface protective layer may be, for example, a film made of one or more of nylon, polyethylene terephthalate, and other materials.

In particular, the outer package member 40 may preferably be an aluminum laminated film in which a polyethylene film, an aluminum foil, and a nylon film are laminated in this order. However, the outer package member 40 may be a laminated film having any other laminated structure, a polymer film such as polypropylene, or a metal film.

An adhesive film 41 for prevention of outside air intrusion may be inserted between the outer package member 40 and the cathode lead 31, and the adhesive film 41 is also inserted between the outer package member 40 and the anode lead 32. The adhesive film 41 is made of a material having adhesibility with respect to the cathode lead 31 and the anode lead 32. Non-limiting examples of the material having adhesibility may include a polyolefin resin. More specific examples thereof may include one or more of polyethylene, polypropylene, modified polyethylene, and modified polypropylene.

[Cathode, Anode, and Separator]

As illustrated in FIG. 4, the cathode 33 may include, for example, a cathode active material layer 33B on both surfaces of a cathode current collector 33A. The anode 34 may include, for example, an anode active material layer 34B on both surfaces of an anode current collector 34A. The configurations of the cathode current collector 33A, the cathode active material layer 33B, the anode current collector 34A, and the anode active material layer 34B are similar to the configurations of the cathode current collector 21A, the cathode active material layer 21B, the anode current collector 22A, and the anode active material layer 22B, respectively. The configuration of the separator 35 is similar to the configuration of the separator 23.

[Electrolyte Layer]

The electrolyte layer 36 includes an electrolytic solution and a polymer compound. The electrolytic solution is held by the polymer compound. The electrolyte layer 36 is a so-called gel electrolyte. The gel electrolyte achieves high ionic conductivity (for example, 1 mS/cm or more at room temperature), and prevents liquid leakage of the electrolytic solution. The electrolyte layer 36 may further include one or more of other materials such as an additive in addition to the foregoing electrolyte solution and the foregoing polymer compound.

The polymer material may contain, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate. In addition thereto, the polymer material may be a copolymer. The copolymer may be, for example, a copolymer of vinylidene fluoride and hexafluoropylene. In particular, polyvinylidene fluoride may be preferable as a homopolymer, and a copolymer of vinylidene fluoride and hexafluoropylene may be preferable as a copolymer. Such polymer compounds are electrochemically stable.

For example, the composition of the electrolytic solution may be similar to the composition of the electrolytic solution used in the cylindrical type secondary battery. However, in the electrolyte layer 36 that is a gel electrolyte, the solvent contained in the electrolyte solution refers to a wide concept that encompasses not only a liquid material but also a material having ionic conductivity that has ability to dissociate the electrolyte salt. Hence, in a case in which a polymer compound having ionic conductivity is used, the polymer compound is also encompassed by the solvent.

It is to be noted that the electrolytic solution may be used as it is instead of the gel electrolyte layer 36. In this case, the spirally wound electrode body 30 is impregnated with the electrolytic solution.

[Operation of Secondary Battery]

The secondary battery may operate, for example, as follows.

When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

[Method of Manufacturing Secondary Battery]

The secondary battery including the gel electrolyte layer 36 may be manufactured, for example, by one of the following three procedures.

In a first procedure, the cathode 33 and the anode 34 are fabricated by a similar fabrication procedure to that of the cathode 21 and the anode 22. More specifically, the cathode 33 is fabricated by forming the cathode active material layer 33B on both surfaces of the cathode current collector 33A, and the anode 34 is fabricated by forming the anode active material layer 34B on both surfaces of the anode current collector 34A. Subsequently, for example, the electrolytic solution, the polymer compound, and a solvent are mixed to prepare a precursor solution. Non-limiting examples of the solvent may include an organic solvent. Subsequently, the cathode 33 and the anode 34 are coated with the precursor solution, and the precursor solution is dried to form the gel electrolyte layer 36. Subsequently, the cathode lead 31 is attached to the cathode current collector 33A by, for example, a welding method, and the anode lead 32 is attached to the anode current collector 34A by, for example, a welding method. Thereafter, the protective tape 37 is attached onto the outermost periphery of the spirally wound body 30. Subsequently, the cathode 33 and the anode 34 are stacked with the separator 35 in between and are spirally wound to fabricate the spirally wound electrode body 30. Subsequently, the outer package member 40 is folded to interpose the spirally wound electrode body 30, and thereafter, the outer edges of the outer package member 40 are bonded by, for example, a thermal fusion bonding method to enclose the spirally wound electrode body 30 in the outer package member 40. In this case, the adhesive films 41 are inserted between the cathode lead 31 and the outer package member 40 and between the anode lead 32 and the outer package member 40.

In a second procedure, the cathode lead 31 is attached to the cathode 33, and the anode lead 32 is attached to the anode 34. Subsequently, the cathode 33 and the anode 34 are stacked with the separator 35 in between and are spirally wound to fabricate a spirally wound body as a precursor of the spirally wound electrode body 30. Thereafter, the protective tape 37 is adhered to the outermost periphery of the spirally wound body. Subsequently, the outer package member 40 is folded to interpose the spirally wound electrode body 30, and thereafter, the outer edges other than one side of the outer package member 40 are bonded by, for example, a thermal fusion bonding method, and the spirally wound body is contained inside a pouch formed of the outer package member 40. Subsequently, the electrolytic solution, monomers that are raw materials of the polymer compound, a polymerization initiator, and, on as-necessary basis, other materials such as a polymerization inhibitor are mixed to prepare a composition for electrolyte. Subsequently, the composition for electrolyte is injected inside the pouch formed of the outer package member 40. Thereafter, the pouch formed of the outer package member 40 is hermetically sealed by, for example, a thermal fusion bonding method. Subsequently, the monomers are thermally polymerized to form the polymer compound. The gel electrolyte layer 36 is thereby formed.

In a third procedure, the spirally wound body is fabricated and contained inside the pouch formed of the outer package member 40 in a similar manner to that of the second procedure described above, except that the separator 35 with both surfaces coated with a polymer compound is used. Non-limiting examples of the polymer compound with which the separator 35 is coated may include a polymer (a homopolymer, a copolymer, or a multicomponent copolymer) containing vinylidene fluoride as a component. Non-limiting specific examples of the homopolymer may include polyvinylidene fluoride. Non-limiting specific examples of the copolymer may include a binary copolymer containing vinylidene fluoride and hexafluoropropylene as components. Non-limiting specific example of the multicomponent copolymer may include a ternary copolymer containing vinylidene fluoride, hexafluoropropylene, and chlorotrifluoroethylene as components. It is to be noted that, one or more of other polymer compounds may be used together with the polymer containing vinylidene fluoride as a component. Subsequently, the electrolytic solution is prepared and injected inside the pouch formed of the outer package member 40. Thereafter, an opening of the pouch formed of the outer package member 40 is hermetically sealed by, for example, a thermal fusion bonding method. Subsequently, the resultant is heated while a weight is applied to the outer package member 40 to allow the separator 35 to be closely attached to the cathode 33 with the polymer compound in between and allow the separator 35 to be closely attached to the anode 34 with the polymer compound in between. Thus, the polymer compound is impregnated with the electrolytic solution, and the polymer compound is gelated. The electrolyte layer 36 is thereby formed.

In the third procedure, swollenness of the secondary battery is suppressed more than in the first procedure. Further, in the third procedure, for example, the monomers that are the raw materials of the polymer compound, and the solvent are hardly left in the electrolyte layer 36, compared to in the second procedure. Accordingly, the formation process of the polymer compound is favorably controlled. As a result, each of the cathode 33, the anode 34, and the separator 35 is sufficiently and closely attached to the electrolyte layer 36.

[Action and Effects of Secondary Battery]

According to the secondary battery, the anode 34 contains the carbon material and silicon oxide, the weight ratio of silicon oxide is within a range of 0.01% to 20% both inclusive, and the electrolyte layer 36 (the electrolytic solution) contains the unsaturated cyclic carbonate ester. Therefore, superior battery characteristics are achievable for a similar reason to the reason in the cylindrical type secondary battery. Action and effects other than those described above are similar to those of the cylindrical type secondary battery.

(2. Applications of Secondary Battery)

Next, description is given of application examples of any of the secondary batteries described above.

Applications of the secondary battery are not specifically limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source (a power source used preferentially), or may be an auxiliary power source (a power source used instead of the main power source or used being switched from the main power source). In a case in which the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery is effectively applicable to, for example but not limited to, the battery pack, the electric vehicle, the electric power storage system, the electric power tool, and the electronic apparatus. In these applications, superior battery characteristics are demanded, and using the secondary battery of the technology makes it possible to effectively improve performance. It is to be noted that the battery pack is a power source that uses the secondary battery, and may be, for example, a so-called assembled battery. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Specific description is given of some application examples of the secondary battery. It is to be noted that configurations of the respective application examples described below are mere examples, and may be changed as appropriate.

(2-1. Battery Pack (Single Battery))

FIG. 5 illustrates a perspective configuration of a battery pack using a single battery. FIG. 6 illustrates a block configuration of the battery pack illustrated in FIG. 5. It is to be noted that FIG. 5 illustrates the battery back in an exploded state.

The battery back described here is a simple battery pack (a so-called soft pack), and is mounted in, for example, an electronic apparatus typified by a smartphone. For example, the battery pack may include a power source 111 that is the laminated film type secondary battery, and a circuit board 116 coupled to the power source 111 as illustrated in FIG. 5. A cathode lead 112 and an anode lead 113 are attached to the power source 111.

A pair of adhesive tapes 118 and 119 are adhered to both side surfaces of the power source 111. A protection circuit module (PCM) is formed in the circuit board 116. The circuit board 116 is coupled to a cathode 112 through a tab 114, and is coupled to an anode lead 113 through a tab 115. Moreover, the circuit board 116 is coupled to a lead 117 provided with a connector for external connection. It is to be noted that while the circuit board 116 is coupled to the power source 111, the circuit board 116 is protected from upper side and lower side by a label 120 and an insulating sheet 121. The label 120 is adhered to fix, for example, the circuit board 116 and the insulating sheet 121.

Moreover, for example, the battery pack may include the power source 111 and the circuit board 116 as illustrated in FIG. 6. The circuit board 116 may include, for example, a controller 121, a switch section 122, a PTC 123, and a temperature detector 124. The power source 111 is connectable to outside through a cathode terminal 125 and an anode terminal 127, and is thereby charged and discharged through the cathode terminal 125 and the anode terminal 127. The temperature detector 124 is allowed to detect a temperature with use of a temperature detection terminal (a so-called T terminal) 126.

The controller 121 controls an operation of the entire battery pack (including a used state of the power source 111), and may include, for example, a central processing unit (CPU) and a memory.

For example, in a case in which a battery voltage reaches an overcharge detection voltage, the controller 121 may so cause the switch section 122 to be disconnected that a charge current does not flow into a current path of the power source 111. Moreover, for example, in a case in which a large current flows during charge, the controller 121 may cause the switch section 122 to be disconnected, thereby blocking the charge current.

In addition, for example, in a case in which the battery voltage reaches an overdischarge detection voltage, the controller 121 may so cause the switch section 122 to be disconnected that a discharge current does not flow into the current path of the power source 111. Moreover, for example, in a case in which a large current flows during discharge, the controller 121 may cause the switch section 122 to be disconnected, thereby blocking the discharge current.

It is to be noted that the overcharge detection voltage of the secondary battery may be, for example, 4.20 V±0.05 V, and the overdischarge detection voltage may be, for example, 2.4 V±0.1 V.

The switch section 122 switches the used state of the power source 111 (whether the power source 111 is connectable to an external device) in accordance with an instruction from the controller 121. The switch section 122 may include, for example, a charge control switch and a discharge control switch. The charge control switch and the discharge control switch may each be, for example, a semiconductor switch such as a field-effect transistor (MOS- FET) using a metal oxide semiconductor. It is to be noted that charge and discharge currents may be detected on the basis of on-resistance of the switch section 122.

The temperature detector 124 measures a temperature of the power source 111, and outputs a result of the measurement to the controller 121. The temperature detector 124 may include, for example, a temperature detecting element such as a thermistor. It is to be noted that the result of the measurement by the temperature detector 124 may be used, for example, but not limited to, in a case in which the controller 121 performs charge and discharge control at the time of abnormal heat generation and in a case in which the controller 121 performs a correction process at the time of calculating remaining capacity.

It is to be noted that the circuit board 116 may not include the PTC 123. In this case, a PTC element may be separately attached to the circuit board 116.

(2-2. Battery Pack (Assembled Battery))

FIG. 7 illustrates a block configuration of a battery pack using an assembled battery. For example, the battery pack may include a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 in a housing 60 made of, for example, a plastic material.

The controller 61 controls an operation of the entire battery pack (including a used state of the power source 62), and may include, for example, a CPU. The power source 62 includes one or more secondary batteries. The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62 (whether the power source 62 is connectable to an external device) in accordance with an instruction from the controller 61. The switch section 63 may include, for example, a charge control switch, a discharge control switch, a charging diode, and a discharging diode. The charge control switch and the discharge control switch may each be, for example, a semiconductor switch such as a field-effect transistor that uses a metal oxide semiconductor (a MOS-FET).

The current measurement section 64 measures a current with the use of the current detection resistance 70, and outputs a result of the measurement to the controller 61. The temperature detector 65 measures a temperature with the use of the temperature detecting element 69, and outputs a result of the measurement to the controller 61. The result of the temperature measurement may be used, for example, but not limited to, in a case in which the controller 61 performs charge and discharge control at the time of abnormal heat generation and in a case in which the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case in which a battery voltage reaches an overcharge detection voltage, the switch controller 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch controller 67 may block the charge current.

Further, for example, in a case in which the battery voltage reaches an overdischarge detection voltage, the switch controller 67 may so cause the switch section 63 (the discharge control switch) to be disconnected that a discharge current does not flow into the current path of the power source 62. This makes it possible to perform only charge through the charging diode in the power source 62. It is to be noted that, for example, when a large current flows during discharge, the switch controller 67 may block the discharge current.

It is to be noted that the overcharge detection voltage of the secondary battery may be, for example, 4.20 V±0.05 V, and the overdischarge detection voltage may be, for example, 2.4 V±0.1 V.

The memory 68 may be, for example, an EEPROM that is a non-volatile memory. The memory 68 may hold, for example, numerical values calculated by the controller 61 and information of the secondary battery measured in a manufacturing process (such as internal resistance in an initial state). It is to be noted that, in a case in which the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 may be, for example, a thermistor.

The cathode terminal 71 and the anode terminal 72 are terminals that may be coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

(2-3. Electric Vehicle)

FIG. 8 illustrates a block configuration of a hybrid automobile that is an example of an electric vehicle. The electric vehicle may include, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case in which the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted electric power is accumulated in the power source 76. In a case in which the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that, when speed of the electric vehicle is decreased by an unillustrated brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The controller 74 controls an operation of the entire electric vehicle, and may include, for example, a CPU. The power source 76 includes one or more secondary batteries. The power source 76 may be coupled to an external power source, and the power source 76 may be allowed to accumulate electric power by receiving electric power supply from the external power source. The various sensors 84 may be used, for example, for control of the number of revolutions of the engine 75 and for control of an opening level (a throttle opening level) of an unillustrated throttle valve. The various sensors 84 may include, for example, a speed sensor, an acceleration sensor, and an engine frequency sensor.

It is to be noted that, although the description has been given of the case in which the electric vehicle is the hybrid automobile, the electric vehicle may be a vehicle (an electric automobile) that operates with use of only the power source 76 and the motor 77 and without using the engine 75.

(2-4. Electric Power Storage System)

FIG. 9 illustrates a block configuration of an electric power storage system. The electric power storage system may include, for example, a controller 90, a power source 91, a smart meter 92, and a power hub 93, inside a house 89 such as a general residence or a commercial building.

In this example, the power source 91 may be coupled to an electric device 94 provided inside the house 89 and may be allowed to be coupled to an electric vehicle 96 parked outside the house 89, for example. Further, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Non-limiting examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The controller 90 controls an operation of the entire electric power storage system (including a used state of the power source 91), and may include, for example, a CPU. The power source 91 includes one or more secondary batteries. The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 in accordance with an instruction from the controller 91. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the foregoing electric power storage system may be provided for each household (each family unit), or may be provided for a plurality of households (a plurality of family units).

(2-5. Electric Power Tool)

FIG. 10 illustrates a block configuration of an electric power tool. The electric power tool may be, for example, an electric drill, and may include a controller 99 and a power source 100, inside a tool body 98 made of a plastic material, for example. A drill section 101 that is a movable section may be attached to the tool body 98 in an operable (rotatable) manner, for example.

The controller 99 controls an operation of the entire electric power tool (including a used state of the power source 100), and may include, for example, a CPU. The power source 100 includes one or more secondary batteries. The controller 99 allows electric power to be supplied from the power source 100 to the drill section 101 in accordance with an operation by an unillustrated operation switch.

EXAMPLES

Examples of the present technology will be described in detail.

Experimental Examples 1-1 to 1-19

The laminated film type lithium-ion secondary batteries illustrated in FIG. 3 and FIG. 4 were fabricated by the following procedure.

The cathode 33 was fabricated as follows. First, 96 parts by mass of a cathode active material ($LiCoO_2$), 3 parts by mass of a cathode binder (polyvinylidene fluoride), and 1 part by mass of a cathode conductor (graphite) were mixed to obtain a cathode mixture. Subsequently, the cathode mixture was dispersed in an organic solvent (N-methyl-2-pyrrolidone) to obtain paste cathode mixture slurry. Subsequently, both surfaces of the cathode current collector 33A (a strip-shaped aluminum foil having a thickness of 20 μm) were coated with the cathode mixture slurry with use of a coating apparatus, and thereafter, the cathode mixture slurry was dried to form the cathode active material layer 33B. Lastly, the cathode active material layer 33B was compression-molded with use of a roll pressing machine.

The anode 34 was fabricated as follows. First, 90 parts by mass of an anode active material (a carbon material and silicon oxide) and 10 parts by mass of an anode binder (polyvinylidene fluoride) were mixed to obtain an anode mixture. The kinds and weight ratios (%) of the carbon material and silicon oxide are as illustrated in Table 1. "SiO" in Table 1 is a compound in which "x" in $SiO_x$ satisfies x=1. It is to be noted that in the silicon oxide, an average particle diameter (D50) was 5 μm, and a specific surface area was 5 $m^2/g$. Subsequently, the anode mixture was dispersed in an organic solvent (N-methyl-2-pyrrolidone) to obtain paste anode mixture slurry. Subsequently, both surfaces of the anode current collector 34A (a strip-shaped copper foil having a thickness of 15 μm) were coated with the anode mixture slurry, and thereafter, the anode mixture slurry was dried to form the anode active material layer 34B. Lastly, the anode active material layer 34B was compression-molded with use of a roll pressing machine. In the anode active material layer 34B, volume density ($g/cm^3$) before compression molding was 1.8 $g/cm^3$, and volume density ($g/cm^3$) in a completely-charged state was 1.1 $g/cm^3$.

The electrolytic solution was prepared as follows. An electrolyte salt ($LiPF_6$) was dissolved in a solvent (ethylene carbonate and propylene carbonate), and thereafter, an unsaturated cyclic carbonate ester (the first unsaturated cyclic carbonate ester) was added to the solvent. In this case, the composition of the solvent was ethylene carbonate: propylene carbonate=50:50 in weight ratio, and a content of the electrolyte salt was 1 mol/kg with respect to the solvent. The kind and content (wt %) of the unsaturated cyclic carbonate ester are as illustrated in Table 1.

The secondary battery was assembled as follows. First, the cathode lead 31 made of aluminum was attached to the cathode 33 (the cathode current collector 33A) by welding, and the anode lead 32 made of copper was attached to the anode 34 (the anode current collector 34A) by welding. Subsequently, the cathode 33 and the anode 34 were stacked with the separator 35 (a microporous polypropylene film having a thickness of 23 μm) in between, and the resultant stacked body was spirally wound in a longitudinal direction to fabricate the spirally wound electrode body 30. Thereafter, the protective tape 37 was attached onto the outermost periphery of the spirally wound electrode body 30. Subsequently, the outer package member 40 was folded to interpose the spirally wound electrode body 30, and thereafter, the outer edges on three sides of the outer package member 40 were thermally fusion-bonded. Thus, the spirally wound electrode body 30 was contained inside a pouch formed of the outer package member 40. The outer package member 40 was a moisture-resistant aluminum laminated film (having a total thickness of 100 μm) in which a nylon film (having a thickness of 30 μm), an aluminum foil (having a thickness of 40 μm), and a cast polypropylene film (having a thickness of 30 μm) were laminated from outside. Lastly, the electrolytic solution was injected inside the outer package member 40, and the spirally wound electrode body 30 was impregnated with the electrolytic solution. Thereafter, outer edges on the remaining one side of the outer package member 40 were thermally fusion-bonded in a reduced-pressure environment. In this case, the adhesive film 41 (an acid-modified propylene film having a thickness of 50 μm) was inserted between cathode lead 31 and the outer package member 40, and the adhesive film 41 was inserted between the anode lead 32 and the outer package member 40 in a similar manner. Thus, the laminated film type secondary battery was completed.

It is to be noted that, when the secondary battery was fabricated, the thickness of the cathode active material layer 33B was so adjusted as to cause the charge-discharge capacity of the anode 34 to be larger than charge-discharge capacity of the cathode 33, thereby prevent lithium metal from being precipitated on the anode 34 in a completely-charged state.

When cycle characteristics, initial capacity characteristics, and load characteristics were examined as battery characteristics of each of the secondary batteries, results illustrated in Table 1 were obtained.

The cycle characteristics were examined as follows. One cycle of charge and discharge was performed on the secondary battery in an ambient temperature environment (at 23° C.) to stabilize a battery state of the secondary battery, and thereafter, one cycle of charge and discharge was further performed on the secondary battery in the same environment to measure discharge capacity at the second cycle. Subsequently, the secondary battery was repeatedly charged and discharged until the total number of cycles reached 100 cycles in the same environment to measure discharge capacity at the 100th cycle. A capacity retention ratio (%)= (discharge capacity at the 100th cycle/discharge capacity at the second cycle)×100 was calculated from these results. When the secondary battery was charged, charge was performed at a current of 0.2 C until the voltage reached 4.3 V, and thereafter, charge was further performed at the voltage of 4.3 V until the current reached 0.05 C. When the secondary battery was discharged, discharge was performed at a current of 0.2 C until the voltage reached 2.5 V. It is to be noted that "0.2 C" refers to a current value at which the battery capacity (theoretical capacity) is completely discharged in 5 hours, and "0.05 C" refers to a current value at which the battery capacity is completely discharged in 20 hours.

The initial capacity characteristics were examined as follows. The secondary battery having a battery state stabilized by a similar procedure to that in a case in which the cycle characteristics were examined was used. The secondary battery was charged in an ambient temperature environment (at 23° C.) to measure charge capacity. Subsequently, the secondary battery was discharged in the same environment to measure discharge capacity. Initial capacity (%)= (discharge capacity/charge capacity)×100 was calculated from these results. The charge and discharge conditions were similar to those in the case of examining the cycle characteristics. Note that values of the initial capacity illustrated in Table 1 were normalized with the initial capacity of Experimental Example 1-7 taken as 100.

The load characteristics were examined as follows. The secondary battery having a battery state stabilized by a similar procedure to that in a case in which the cycle characteristics were examined was used. The secondary battery was charged and discharged in an ambient temperature environment (at 23° C.) to measure discharge capacity at the second cycle. Subsequently, the secondary battery was charged and discharged again in the same environment to measure discharge capacity at the third cycle. A load retention ratio (%)=(discharge capacity at the third cycle/discharge capacity at the second cycle)×100 was calculated from these results. The charge and discharge conditions at the second cycle were similar to those in the case of examining the cycle characteristics. The charge and discharge condition at the third cycle were similar to those in the case of examining the cycle characteristics, except that a current during discharge was changed to 2 C. It is to be noted that "2 C" refers to a current value at which the battery capacity is completely discharged in 0.5 hours.

These results predict that in a case in which the anode active material contains silicon oxide together with the carbon material, and the electrolytic solution contains the first unsaturated cyclic carbonate ester, the cycle retention ratio exhibits a combination of the foregoing largely decreasing tendency and the foregoing slightly increasing tendency. Hence, it is considered that the cycle retention ratio is decreased, as compared with the foregoing reference.

However, in actuality (Experimental Examples 1-2 to 1-11), when the weight ratio of silicon oxide was within a range of 0.01% to 20% both inclusive (Experimental

TABLE 1

| Experimental Example | Carbon Material | | Silicon Oxide | | Unsaturated Cyclic Carbonate Ester | | Cycle Retention Ratio (%) | Initial Capacity | Load Retention Ratio (%) |
|---|---|---|---|---|---|---|---|---|---|
| | Kind | Weight Ratio (%) | Kind | Weight Ratio (%) | Kind | Content (wt %) | | | |
| 1-1 | Graphite | 100 | SiO | 0 | Formula (1-4) | 3 | 78 | 90 | 82 |
| 1-2 | | 99.99 | | 0.01 | | | 77 | 91 | 85 |
| 1-3 | | 99.9 | | 0.1 | | | 77 | 91 | 86 |
| 1-4 | | 95 | | 5 | | | 78 | 94 | 86 |
| 1-5 | | 90 | | 10 | | | 79 | 95 | 87 |
| 1-6 | | 80 | | 20 | | | 76 | 96 | 88 |
| 1-7 | | 50 | | 50 | | | 60 | 100 | 89 |
| 1-8 | | 0 | | 100 | | | 52 | 110 | 88 |
| 1-9 | | 95 | | 5 | Formula (1-16) | 3 | 75 | — | — |
| 1-10 | | 95 | | 5 | Formula (1-18) | 3 | 74 | — | — |
| 1-11 | | 95 | | 5 | Formula (1-32) | 3 | 74 | — | — |
| 1-12 | Graphite | 100 | SiO | 0 | — | — | 73 | — | — |
| 1-13 | | 99.99 | | 0.01 | | | 71 | — | — |
| 1-14 | | 99.9 | | 0.1 | | | 70 | — | — |
| 1-15 | | 95 | | 5 | | | 62 | — | — |
| 1-16 | | 90 | | 10 | | | 61 | — | — |
| 1-17 | | 80 | | 20 | | | 60 | — | — |
| 1-18 | | 50 | | 50 | | | 59 | — | — |
| 1-19 | | 0 | | 100 | | | 58 | — | — |

The cycle retention ratio, the initial capacity, and the load retention ratio were changed depending on presence and absence of each of silicon oxide and the first unsaturated cyclic carbonate ester.

More specifically, the cycle retention ratio, the initial capacity, and the load retention ratio exhibited a tendency to be described below when using, as a reference, a case which the anode active material contained only the carbon material and the electrolytic solution did not contain the first unsaturated cyclic carbonate ester (Experimental Example 1-12).

In a case in which the anode active material contained silicon oxide together with the carbon material, but the electrolytic solution did not contain the first unsaturated cyclic carbonate ester (Experimental Examples 1-13 to 1-18), the cycle retention ratio was decreased, as compared with the foregoing reference. A similar tendency was exhibited even in a case in which the anode active material contained only silicon oxide and the electrolytic solution did not contain the first unsaturated cyclic carbonate ester (Experimental Example 1-19). In these cases, in particular, the cycle retention ratio was largely decreased, as the weight ratio of silicon oxide increased.

Moreover, in a case in which the anode active material contained only the carbon material and the electrolytic solution contained the first unsaturated cyclic carbonate ester (Experimental Example 1-1), the cycle retention ratio was slightly increased, as compared with the foregoing reference.

Examples 1-2 to 1-6 and 1-9 to 1-11), a substantially equal cycle retention ratio was achieved, and higher initial capacity and a higher load retention ratio were achieved, as compared with the case in which the anode active material contained only the carbon material and the electrolytic solution contained the first unsaturated cyclic carbonate ester (Experimental Example 1-1). It is to be noted that when the weight ratio of silicon oxide was out of the foregoing range in the case in which the anode active material contained silicon oxide together with the carbon material and the electrolytic solution contained the first unsaturated cyclic carbonate ester (Experimental Examples 1-7 and 1-8), the cycle retention ratio was rather decreased, as compared with the foregoing reference.

This result indicates that when the weight ratio of silicon oxide is within an appropriate range (=0.01% to 20% both inclusive), a specific advantage in the cycle characteristics, the initial capacity characteristics, and the load characteristics is achieved, contrary to prediction. In other words, in a case in which the anode active material contains silicon oxide together with the carbon material and the electrolytic solution contains the first unsaturated cyclic carbonate ester, when the weight ratio of silicon oxide is within an appropriate range, decomposition reaction of the electrolytic solution is specifically suppressed while using high-reactive silicon oxide.

Experimental Examples 2-1 to 2-16 and 3-1 to 3-16

As illustrated in Tables 2 and 3, the secondary batteries were fabricated by a similar procedure, except that the kind of the unsaturated cyclic carbonate ester was changed, and the battery characteristics of the secondary batteries were examined. Instead of the first unsaturated cyclic carbonate ester, vinylene carbonate (VC) that was the second unsaturated cyclic carbonate ester and vinyl ethylene carbonate (VEC) that was the third unsaturated cyclic carbonate ester were used as the unsaturated cyclic carbonate ester.

TABLE 2

| Experimental Example | Carbon Material Kind | Weight Ratio (%) | Silicon Oxide Kind | Weight Ratio (%) | Unsaturated Cyclic Carbonate Ester Kind | Content (wt %) | Cycle Retention Ratio (%) |
|---|---|---|---|---|---|---|---|
| 2-1 | Graphite | 100 | SiO | 0 | VC | 3 | 75 |
| 2-2 | | 99.99 | | 0.01 | | | 74 |
| 2-3 | | 99.9 | | 0.1 | | | 74 |
| 2-4 | | 95 | | 5 | | | 75 |
| 2-5 | | 90 | | 10 | | | 76 |
| 2-6 | | 80 | | 20 | | | 73 |
| 2-7 | | 50 | | 50 | | | 57 |
| 2-8 | | 0 | | 100 | | | 49 |
| 2-9 | Graphite | 100 | SiO | 0 | — | — | 70 |
| 2-10 | | 99.99 | | 0.01 | | | 68 |
| 2-11 | | 99.9 | | 0.1 | | | 67 |
| 2-12 | | 95 | | 5 | | | 59 |
| 2-13 | | 90 | | 10 | | | 58 |
| 2-14 | | 80 | | 20 | | | 57 |
| 2-15 | | 50 | | 50 | | | 56 |
| 2-16 | | 0 | | 100 | | | 55 |

TABLE 3

| Experimental Example | Carbon Material Kind | Weight Ratio (%) | Silicon Oxide Kind | Weight Ratio (%) | Unsaturated Cyclic Carbonate Ester Kind | Content (wt %) | Cycle Retention Ratio (%) |
|---|---|---|---|---|---|---|---|
| 3-1 | Graphite | 100 | SiO | 0 | VEC | 3 | 74 |
| 3-2 | | 99.99 | | 0.01 | | | 73 |
| 3-3 | | 99.9 | | 0.1 | | | 73 |
| 3-4 | | 95 | | 5 | | | 74 |
| 3-5 | | 90 | | 10 | | | 75 |
| 3-6 | | 80 | | 20 | | | 72 |
| 3-7 | | 50 | | 50 | | | 56 |
| 3-8 | | 0 | | 100 | | | 48 |
| 3-9 | Graphite | 100 | SiO | 0 | — | — | 69 |
| 3-10 | | 99.99 | | 0.01 | | | 67 |
| 3-11 | | 99.9 | | 0.1 | | | 66 |
| 3-12 | | 95 | | 5 | | | 58 |
| 3-13 | | 90 | | 10 | | | 57 |
| 3-14 | | 80 | | 20 | | | 56 |
| 3-15 | | 50 | | 50 | | | 55 |
| 3-16 | | 0 | | 100 | | | 54 |

Even though the kind of the unsaturated cyclic carbonate ester was changed, similar results to those in Table 1 were achieved. In other words, in a case in which the anode active material contained silicon oxide together with the carbon material and the electrolytic solution contained the second unsaturated cyclic carbonate ester (Table 2), when the weight ratio of the silicon oxide was within a range of 0.01% to 20% both inclusive, a high cycle retention ratio was achieved. This tendency is exhibited even in a case in which the anode active material contained silicon oxide together with the carbon material and the electrolytic solution contained the third unsaturated cyclic carbonate ester (Table 3).

In particular, the cycle retention ratio in the case in which the first unsaturated cyclic compound was used as the unsaturated cyclic carbonate ester (Table 1) was higher than that in the case in which the second unsaturated cyclic compound and the third unsaturated cyclic compound were used (Tables 2 and 3).

Experimental Examples 4-1 to 4-6

As illustrated in Table 4, the secondary batteries were fabricated by a similar procedure, except that the composition of silicon oxide (the value x in $SiO_x$) was changed, and the battery characteristics of the secondary batteries were examined. In order to change the composition of silicon oxide, an oxygen introduction amount at the time of melting and solidification of a raw material (silicon) was adjusted to change an oxidized state of silicon.

TABLE 4

Carbon Material (Graphite) = 95%, Silicon Oxide = 5%
Unsaturated Cyclic Carbonate Ester (Formula (1-4)) = 3 wt %

| Experimental Example | Silicon Oxide Composition | x | Cycle Retention Ratio (%) |
|---|---|---|---|
| 4-1 | $SiO_x$ | 0.4 | 77 |
| 4-2 | | 0.5 | 78 |
| 4-3 | | 0.8 | 79 |
| 1-4 | | 1 | 78 |
| 4-4 | | 1.2 | 77 |
| 4-5 | | 1.5 | 77 |
| 4-6 | | 1.6 | 76 |

When "x" satisfied $0.5 \leq x \leq 1.5$ (Experimental Examples 4-2 to 4-5), the cycle retention ratio was higher, as compared with other cases (Experimental Examples 4-1 and 4-6).

Experimental Examples 5-1 to 5-7

As illustrated in Table 5, the secondary batteries were fabricated by a similar procedure, except that the average particle diameter (D50: μm) of silicon oxide was changed, and the battery characteristics of the secondary batteries were examined. In order to change the average particle diameter of silicon oxide, silicon oxides having different average particle diameters were used.

TABLE 5

Carbon Material (Graphite) = 95%, Silicon Oxide (SiO) = 5%
Unsaturated Cyclic Carbonate Ester (Formula (1-4)) = 3 wt %

| Experimental Example | silicon oxide D50 (μm) | Cycle Retention Ratio (%) |
|---|---|---|
| 5-1 | 0.09 | 71 |
| 5-2 | 0.1 | 74 |
| 5-3 | 1 | 76 |
| 5-4 | 2.5 | 78 |
| 1-4 | 5 | 78 |
| 5-5 | 7.5 | 77 |
| 5-6 | 10 | 75 |
| 5-7 | 10.1 | 71 |

In a case in which the average particle diameter was within a range of 0.1 μm to 10 μm both inclusive (Experimental Examples 5-2 to 5-6), the cycle retention ratio was higher, as compared with other cases (Experimental Examples 5-1 and 5-7).

Experimental Examples 6-1 to 6-6

As illustrated in Table 6, the secondary batteries were fabricated by a similar procedure, except that the specific surface area (m²/g) of silicon oxide was changed, and the battery characteristics of the secondary batteries were examined. In order to change the specific surface area of silicon oxide, silicon oxides having different specific surface areas were used.

TABLE 6

Carbon Material (Graphite) = 95%, Silicon Oxide (SiO) = 5%
Unsaturated Cyclic Carbonate Ester (Formula (1-4)) = 3 wt %

| Experimental Example | Silicon Oxide Specific Surface Area (m²/g) | Cycle Retention Ratio (%) |
|---|---|---|
| 6-1 | 0.9 | 74 |
| 6-2 | 1 | 77 |
| 6-3 | 2.5 | 77 |
| 1-4 | 5 | 78 |
| 6-4 | 7.5 | 76 |
| 6-5 | 10 | 74 |
| 6-6 | 10.1 | 71 |

The cycle retention ratio was changed depending on the specific surface are of silicon oxide. In this case, in particular, in a case in which the specific surface area was within a range of 1 m²/g to 10 m²/g both inclusive (Experimental Examples 6-2 to 6-5), the cycle retention ratio was higher, as compared with other cases (Experimental Examples 6-1 and 6-6).

Experimental Examples 7-1 to 7-9

As illustrated in Table 7, the secondary batteries were fabricated by a similar procedure, except that the content C (wt %) of the unsaturated cyclic carbonate ester in the electrolytic solution and the ratio C/R were changed, and the battery characteristics of the secondary batteries were examined. In order to change the ratio C/R, the weight ratio R of silicon oxide was fixed, and the content C of the unsaturated cyclic carbonate ester was changed.

TABLE 7

Carbon Material (Graphite) = 95%

| Experimental Example | Silicon Oxide | | Unsaturated Cyclic Carbonate Ester | | Ratio C/R | Cycle Retention Ratio (%) |
|---|---|---|---|---|---|---|
| | Kind | Weight Ratio R (%) | Kind | Content C (wt %) | | |
| 7-1 | SiO | 5 | Formula (1-4) | 0.009 | 0.0018 | 61 |
| 7-2 | | | | 0.01 | 0.002 | 72 |
| 7-3 | | | | 0.1 | 0.02 | 74 |
| 7-4 | | | | 0.5 | 0.1 | 75 |
| 7-5 | | | | 1 | 0.2 | 76 |
| 1-4 | | | | 3 | 0.6 | 78 |
| 7-6 | | | | 5 | 1 | 77 |
| 7-7 | | | | 7 | 1.4 | 76 |
| 7-8 | | | | 10 | 2 | 74 |
| 7-9 | | | | 10.1 | 2.02 | 66 |

In a case in which the content C was within a range of 0.01 wt % to 10 wt % both inclusive, and the ratio C/R was within a range of 0.002 to 2 both inclusive (Experimental Examples 7-2 to 7-8), the cycle retention ratio was higher, as compared with other cases (Experimental Examples 7-1 and 7-9).

Experimental Examples 8-1 to 8-9

As illustrated in Table 8, the secondary batteries were fabricated by a similar procedure, except that the volume density (g/cm³) of the anode 22 (the anode active material layer 22B) in a completely-charged state was changed, and the battery characteristics of the secondary batteries were examined. In order to change the volume density of the anode active material layer 22B in the completely-charged state, pressure during compression-molding was fixed, and the volume density of the anode active material layer 22B before the compression-molding was changed. The completely-charged state described here is a state in which charge is completed under similar conditions to those in the case in which the cycle characteristics were examined, except that a target voltage for charge was changed to 4.35 V. More specifically, in the state, the secondary battery was charged at a current of 0.2 C until the voltage reached 4.35 V, and thereafter, the secondary battery was charged at the voltage of 4.35 V until the current reached 0.05 C.

TABLE 8

Carbon Material (Graphite) = 95%, Silicon Oxide (SiO) = 5%
Unsaturated Cyclic Carbonate Ester (Formula (1-4)) = 3 wt %

| Experimental Example | Volume Density (g/cm³) | | Cycle Retention Ratio (%) |
|---|---|---|---|
| | Before Compression-molding | Charged State | |
| 8-1 | 1.5 | 0.79 | 72 |
| 8-2 | 1.6 | 0.8 | 75 |
| 8-3 | 1.7 | 0.9 | 77 |
| 1-4 | 1.8 | 1.1 | 78 |
| 8-4 | 1.83 | 1.2 | 78 |
| 8-5 | 1.85 | 1.3 | 78 |
| 8-6 | 1.9 | 1.4 | 76 |
| 8-7 | 1.93 | 1.5 | 74 |
| 8-8 | 1.95 | 1.55 | 73 |
| 8-9 | 1.97 | 1.56 | 72 |

In a case in which the volume density in the completely-charge state was within a range of 0.8 g/cm³ 1.55 g/cm³ both inclusive (Experimental Examples 8-2 to 8-8), the cycle retention ratio was higher, as compared with other cases (Experimental Examples 8-1 and 8-9).

Experimental Examples 9-1 to 9-3

As illustrated in Table 9, the secondary batteries were fabricated by a similar procedure, except that an anode conductor was contained in the anode mixture, and the battery characteristics of the secondary batteries were examined. The anode mixture was prepared by a similar procedure, except that part (2%) of graphite that was the anode active material (the carbon material) was replaced by an anode conductor (a carbon nanotube (CNT) that was a carbon material having a fibrous shape). An average fiber diameter (nm) of the CNT was as illustrated in Table 9.

TABLE 9

| Experimental Example | Carbon Material Kind | Carbon Material Weight Ratio (%) | Kind (nm) | Weight Ratio (%) | Silicon Oxide Kind | Silicon Oxide Weight Ratio (%) | Unsaturated Cyclic Carbonate Ester Kind | Content (wt %) | Cycle Retention Ratio (%) |
|---|---|---|---|---|---|---|---|---|---|
| 1-4 | Graphite | 93 | — | 2 | SiO | 5 | Formula (1-4) | 3 | 78 |
| 9-1 | | | CNT (100) | | | | | | 79 |
| 9-2 | | | CNT (50) | | | | | | 80 |
| 9-3 | | | CNT (10) | | | | | | 82 |

In a case in which the anode mixture contained the anode conductor (Experimental Examples 9-1 to 9-3), the cycle retention ratio was further increased, as compared with the case in which the anode conductor was not contained (Experimental Example 1-4). In this case, in particular, the cycle retention ratio was gradually increased, as the average fiber diameter of the CNT was shortened.

Experimental Examples 10-1 to 10-3

As illustrated in Table 10, the secondary batteries were fabricated by a similar procedure, except that an additive was added to the electrolytic solution, and the battery characteristics of the secondary batteries were examined. As the additive, 4-fluoro-1,3-dioxolane-2-one (FEC) that was a cyclic halogenated carbonate ester, propanedisulfonic anhydride (PSAH) that was an acid anhydride, and succinonitrile (SN) that was a dicyano compound were used. In this case, a content of FEC was 2 wt %, and a content of each of PSAH and SN was 0.5 wt %.

TABLE 10

Carbon Material (Graphite) = 95%, Silicon Oxide (SiO) = 5%
Unsaturated Cyclic Carbonate Ester (Formula (1-4)) = 3 wt %

| Experimental Example | Electrolytic Solution Kind | Content (wt %) | Cycle Retention Ratio (%) |
|---|---|---|---|
| 1-4 | — | — | 78 |
| 10-1 | FEC | 2 | 82 |
| 10-2 | PSAH | 0.5 | 80 |
| 10-3 | SN | 0.5 | 80 |

In a case in which the electrolytic solution contained an additive such as FEC (Experimental Example 10-1 to 10-3), the cycle retention ratio was higher, as compared with the case in which the additive was not contained (Experimental Example 1-4).

Experimental Examples 11-1 to 11-6

As illustrated in Table 11, the secondary batteries were fabricated by a similar procedure, except that the kind of the anode binder was changed, and the battery characteristics of the secondary batteries were examined. Instead of polyvinylidene fluoride (PVDF), polyimide (PI), polyamide imide (PAI), styrene-butadiene rubber (SBR), a mixture of SBR and carboxymethyl cellulose (CMC), polyacrylonitrile (PAN), and polytetrafluoroethylene (PTFE) were used as the anode binder.

TABLE 11

Carbon Material (Graphite) = 95%, Silicon Oxide (SiO) = 5%
Unsaturated Cyclic Carbonate Ester (Formula (1-4)) = 3 wt %

| Experimental Example | Anode Binder | Cycle Retention Ratio (%) |
|---|---|---|
| 1-4 | PVDF | 78 |
| 11-1 | PI | 80 |
| 11-2 | PAI | 80 |
| 11-3 | SBR | 79 |
| 11-4 | SBR + CMC | 80 |
| 11-5 | PAN | 79 |
| 11-6 | PTFE | 78 |

Even though the kind of the anode binder was changed, similar results to those in Table 1 were obtained.

Experimental Examples 12-1 and 12-2

As illustrated in Table 12, the secondary batteries were fabricated by a similar procedure, except that the kind of the cathode active material was changed, and the battery characteristics of the secondary batteries were examined. Instead of $LiCoO_2$, $Li(Ni_{0.8}Co_{0.15}Al_{0.05})O_2$ and $Li(Ni_{0.5}Co_{0.2}Mn_{0.3})O_2$ were used as the cathode active material.

TABLE 12

Carbon Material (Graphite) = 95%, Silicon Oxide (SiO) = 5%
Unsaturated Cyclic Carbonate Ester (Formula (1-4)) = 3 wt %

| Experimental Example | Cathode Active Material | Cycle Retention Ratio (%) |
|---|---|---|
| 1-4 | $LiCoO_2$ | 78 |
| 12-1 | $Li(Ni_{0.8}Co_{0.15}Al_{0.05})O_2$ | 82 |
| 12-2 | $Li(Ni_{0.5}Co_{0.2}Mn_{0.3})O_2$ | 80 |

Even though the kind of the cathode active material was changed, similar results to those in Table 1 were obtained.

Experimental Examples 13-1 to 13-4

As illustrated in Table 13, the secondary batteries were fabricated by a similar procedure, except that the composition of the electrolytic solution was changed, and overdischarge resistance characteristics were examined as battery characteristics.

The electrolytic solution was prepared by a similar procedure, except that an electrolyte salt was dissolved in a solvent, and thereafter, a cyclic halogenated carbonate ester was added together with the first unsaturated cyclic carbonate ester to the solvent. The kinds and contents (wt %) of the first unsaturated cyclic carbonate ester and the cyclic halogenated carbonate ester are as illustrated in Table 13.

The overdischarge resistance characteristics were examined as follows. The secondary battery having a battery state stabilized by a similar procedure to that in the case in which the cycle characteristics were examined was used. The secondary battery was charged in an ambient temperature environment (at 23° C.) to a completely-charged state, and thereafter, a thickness (mm) of the secondary battery in the completely-charged state was measured. Subsequently, the secondary battery was discharged (overdischarged) until the voltage reached a voltage illustrated in Table 13 (cut-off voltage). Subsequently, the secondary battery was charged again to the completely-charged state in the same environment, and thereafter, the thickness (mm) of the secondary battery in the completely-charged state was measured. A swollenness rate (%)=(the thickness of the secondary battery in the completely-charged state after being overdischarged/the thickness of the secondary battery in the completely-charged state before being overdischarged)×100 was calculated from these results. The charge and discharge conditions were similar to those in the case of examining the cycle characteristics, except that the cut-off voltage was changed on as-necessary basis as illustrated in Table 13. The completely-charged state described here is a state in which charge is completed under similar conditions to those in the case of examining the cycle characteristics. More specifically, in the state, the secondary battery was charged at a current of 0.2 C until the voltage reached 4.3 V, and thereafter, the secondary battery was charged at the voltage of 4.3 V until the current reached 0.05 C.

TABLE 13

Carbon Material (Graphite) = 95%, Silicon Oxide (SiO) = 5%

| Experimental Example | Electrolytic Solution | | | | Cut-off Voltage (V) | Swollenness Rate (%) |
|---|---|---|---|---|---|---|
| | Kind | Content (wt %) | Kind | Content (wt %) | | |
| 13-1 | Formula (1-4) | 2 | FEC | 3 | 2.5 | 0.8 |
| 13-2 | | | | | 1.6 | 0.9 |
| 13-3 | — | — | FEC | 3 | 2.5 | 0.9 |
| 13-4 | | | | | 1.6 | 15.7 |

In a case in which the anode active material contained silicon oxide together with the carbon material and the weight ratio of the silicon oxide was within a range of 0.01% to 20% both inclusive, but the electrolytic solution did not contain the first unsaturated cyclic carbonate ester (Experimental Examples 13-3 and 13-4), when the cut-off voltage was high, swollenness hardly occurred. In contrast, when the cut-off voltage was low, noticeable swollenness occurred.

In contrast, in a case in which the anode active material contained silicon oxide together with the carbon material, the weight ratio of the silicon oxide was within a range of 0.01% to 20% both inclusive, and the electrolytic solution contained the first unsaturated cyclic carbonate ester (Experimental Examples 13-1 and 13-2), swollenness hardly occurred independently of the cut-off voltage.

As can be seen from the results in Tables 1 to 13, when the anode 22 contained the carbon material and silicon oxide, the weight ratio of the silicon oxide was within a range of 0.01% to 20% both inclusive, and the electrolytic solution contained the unsaturated cyclic carbonate ester, superior battery characteristics were achieved.

Although the present technology has been described above referring to some embodiments and examples, the present technology is not limited thereto, and may be variously modified. For example, the description has been given with reference to examples in which the battery structure is of the cylindrical type and the laminated film type, and the battery element has the spirally wound structure. However, the battery structure and the battery element structure are not limited thereto. The secondary battery of the present technology is similarly applicable also to a case in which other battery structure such as that of a square type, a coin type or a button type is employed. Moreover, the secondary battery of the present technology is similarly applicable also to a case in which the battery element has other structure such as a stacked structure.

Moreover, a secondary battery-use electrode of the present technology may be applicable not only to secondary batteries but also to other electrochemical devices. Non-limiting examples of other electrochemical devices may include a capacitor.

It is to be noted that the present technology may have the following configurations.

(1)

A secondary battery including:
a cathode;
an anode; and
a nonaqueous electrolytic solution,
the anode containing a carbon material and silicon oxide,
a weight ratio (%) of the silicon oxide with respect to a total of the carbon material and the silicon oxide being within a range of 0.01% to 20% both inclusive, and
the nonaqueous electrolytic solution containing an unsaturated cyclic carbonate ester.

(2)

The secondary battery according to (1), wherein
the carbon material contains graphite,
the silicon oxide is represented by $SiO_x$ ($0<x<2$), and
the unsaturated cyclic carbonate ester contains one or more of a compound represented by the following formula (1), a compound represented by the following formula (2), and a compound represented by the following formula (3),

[Chem. 8]

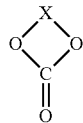

(1)

where X is a divalent group in which m-number of >C=CR1R2 and n-number of >CR3R4 are bound in any order, each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group in which two or more kinds thereof are bound, any two or more of R1 to R4 are optionally bound to each other, m is an integer satisfying m≥1, and n is an integer satisfying n≥0, and

[Chem. 9]

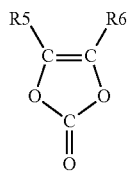

(2)

-continued

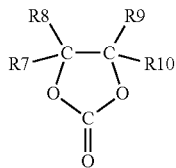
(3)

where each of R5 and R6 is one of a hydrogen group and a monovalent saturated hydrocarbon group, each of R7 to R10 is one of a hydrogen group, a monovalent saturated hydrocarbon group, and a monovalent unsaturated hydrocarbon group, and one or more of R7 to R10 are the monovalent unsaturated hydrocarbon group.

(3)

The secondary battery according to (2), wherein the halogen group is one of a fluorine group, a chlorine group, a bromine group, and an iodine group, the monovalent hydrocarbon group is one of a alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 3 to 18 carbon atoms, and a group in which two or more kinds thereof are bound, the monovalent oxygen-containing hydrocarbon group is an alkoxy group having 1 to 12 carbon atoms, the monovalent halogenated hydrocarbon group is a group in which one or more hydrogen groups in the monovalent hydrocarbon group are substituted by the halogen group, the monovalent halogenated oxygen-containing hydrocarbon group is a group in which one or more hydrogen groups in the monovalent oxygen-containing hydrocarbon group are substituted by the halogen group, the monovalent saturated hydrocarbon group is an alkyl group having 1 to 12 carbon atoms, and the monovalent unsaturated hydrocarbon group is an alkenyl group having 2 to 12 carbon atoms.

(4)

The nonaqueous secondary battery according to (2) or (3), wherein the compound represented by the formula (1) contains one or both of a compound represented by the following formula (4) and a compound represented by the following formula (5),

[Chem. 10]

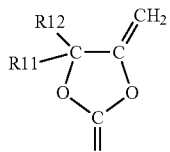
(4)

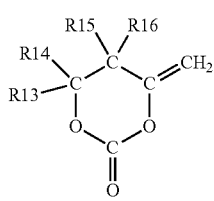
(5)

where each of R11 to R16 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group in which two or more kinds thereof are bound, R11 and R12 are optionally bound to each other, and any two or more of R13 to R16 are optionally bound to each other.

(5)

The secondary battery according to any one of (2) to (4), wherein the x satisfies $0.5 \leq x \leq 1.5$.

(6)

The secondary battery according to any one of (1) to (5), wherein an average particle diameter (D50: μm) of the silicon oxide is within a range of 0.1 μm to 10 μm both inclusive, and a specific surface area (m$^2$/g) of the silicon oxide is within a range of 1 m$^2$/g to 10 m$^2$/g both inclusive.

(7)

The secondary battery according to any one of (1) to (6), wherein a content (wt %) of the unsaturated cyclic carbonate ester in the nonaqueous electrolytic solution is within a range of 0.01 wt % to 10 wt % both inclusive.

(8)

The secondary battery according to any one of (1) to (7), wherein a ratio C/R of a content C (wt %) of the unsaturated cyclic carbonate ester in the nonaqueous electrolytic solution and a weight ratio R (%) of the silicon oxide with respect to the total of the carbon material and the silicon oxide is within a range of 0.002 to 2 both inclusive.

(9)

The secondary battery according to any one of (1) to (8), wherein the anode includes an anode active material layer provided on an anode current collector, the anode active material layer contains the carbon material and the silicon oxide, and volume density (g/cm$^3$) of the anode active material layer in a completely-charged state is within a range of 0.8 g/cm$^3$ to 1.55 g/cm$^3$ both inclusive.

(10)

The secondary battery according to any one of (1) to (9), wherein the secondary battery is a lithium-ion secondary battery.

(11)

A battery pack including:

the secondary battery according to any one of (1) to (10);

a controller that controls an operation of the secondary battery; and a switch section that switches the operation of the secondary battery in accordance with an instruction from the controller.

(12)

An electric vehicle including:

the secondary battery according to any one of (1) to (10);

a converter that converts electric power supplied from the secondary battery into drive power;

a drive section that operates in accordance with the drive power; and a controller that controls an operation of the secondary battery.

(13)

An electric power storage system including:

the secondary battery according to any one of (1) to (10);

one or more electric devices that are supplied with electric power from the secondary battery; and a controller that controls the supplying of the electric power from the secondary battery to the one or more electric devices.

(14)
An electric power tool including:
the secondary battery according to any one of (1) to (10); and
a movable section that is supplied with electric power from the secondary battery.

(15)
An electronic apparatus including the secondary battery according to any one of (1) to (10) as an electric power supply source.

This application claims the priority on the basis of Japanese Patent Application No. 2014-087174 filed on Apr. 21, 2014 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A secondary battery, comprising:
a cathode;
an anode; and
a nonaqueous electrolytic solution,
the anode containing a carbon material and silicon oxide,
a weight ratio (%) of the silicon oxide to a total of the carbon material and the silicon oxide is within a range of 0.01% to 20% both inclusive, and
the nonaqueous electrolytic solution containing an unsaturated cyclic carbonate ester, wherein the unsaturated cyclic carbonate ester is a compound represented by formula (1),

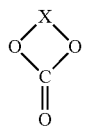

(1)

where X is a divalent group in which m-number of >C=CR1R2 and n-number of >CR3R4 are bound in any order, each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds thereof are bound to each other,
two or more of R1 to R4 are optionally bound to each other, m is an integer satisfying m≥1, and n is an integer satisfying n≥0,
wherein the compound represented by the formula (1) contains one or both of a compound represented by formula (4) or a compound represented by formula (5),

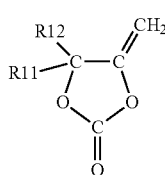

(4)

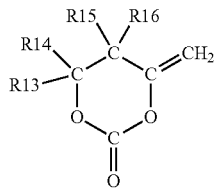

(5)

where each of R11 to R16 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds thereof are bound,
wherein R11 and R12 are optionally bound to each other, and two or more of R13 to R16 are optionally bound to each other.

2. The secondary battery according to claim 1, wherein the carbon material contains graphite, and
the silicon oxide is represented by $SiO_x$, where $0<x<2$.

3. The secondary battery according to claim 1, wherein the halogen group is one of a fluorine group, a chlorine group, a bromine group, or an iodine group,
the monovalent hydrocarbon group is one of a alkyl group having 1 to 12 carbon atoms, an alkenyl group having 2 to 12 carbon atoms, an alkynyl group having 2 to 12 carbon atoms, an aryl group having 6 to 18 carbon atoms, a cycloalkyl group having 3 to 18 carbon atoms, or a group in which two or more kinds thereof are bound,
the monovalent oxygen-containing hydrocarbon group is an alkoxy group having 1 to 12 carbon atoms,
the monovalent halogenated hydrocarbon group is a group in which one or more hydrogen groups in the monovalent hydrocarbon group are substituted by the halogen group, and
the monovalent halogenated oxygen-containing hydrocarbon group is a group in which one or more hydrogen groups in the monovalent oxygen-containing hydrocarbon group are substituted by the halogen group.

4. The secondary battery according to claim 2, wherein the x satisfies $0.5≤x≤1.5$.

5. The secondary battery according to claim 1, wherein an average particle diameter (D50: μm) of the silicon oxide is within a range of 0.1 μm to 10 μm both inclusive, and
a specific surface area ($m^2/g$) of the silicon oxide is within a range of 1 $m^2/g$ to 10 $m^2/g$ both inclusive.

6. The secondary battery according to claim 1, wherein a content (wt %) of the unsaturated cyclic carbonate ester in the nonaqueous electrolytic solution is within a range of 0.01 wt % to 10 wt % both inclusive.

7. The secondary battery according to claim 1, wherein a ratio C/R of a content C (wt %) of the unsaturated cyclic carbonate ester in the nonaqueous electrolytic solution and the weight ratio R (%) of the silicon oxide to the total of the carbon material and the silicon oxide is within a range of 0.002 to 2 both inclusive.

8. The secondary battery according to claim 1, wherein the anode includes an anode active material layer provided on an anode current collector,
the anode active material layer contains the carbon material and the silicon oxide, and volume density (g/cm$^3$) of the anode active material layer in a completely-charged state is within a range of 0.8 g/cm$^3$ to 1.55 g/cm$^3$ both inclusive.

9. The secondary battery according to claim 1, wherein the secondary battery is a lithium-ion secondary battery.

10. A battery pack, comprising:
a secondary battery;
a controller that controls an operation of the secondary battery; and
a switch section that switches the operation of the secondary battery based on an instruction from the controller,
the secondary battery including a cathode, an anode, and a nonaqueous electrolytic solution,
the anode containing a carbon material and silicon oxide,
a weight ratio (%) of the silicon oxide to a total of the carbon material and the silicon oxide is within a range of 0.01% to 20% both inclusive, and
the nonaqueous electrolytic solution containing an unsaturated cyclic carbonate ester, wherein the unsaturated cyclic carbonate ester is a compound represented by formula (1),

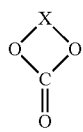

(1)

where X is a divalent group in which m-number of >C=CR1R2 and n-number of >CR3R4 are bound in any order, each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds thereof are bound to each other,
two or more of R1 to R4 are optionally bound to each other, m is an integer satisfying m≥1, and n is an integer satisfying n≥0
wherein the compound represented by the formula (1) contains one or both of a compound represented by formula (4) or a compound represented by formula (5),

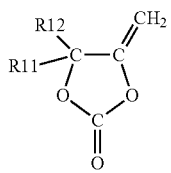

(4)

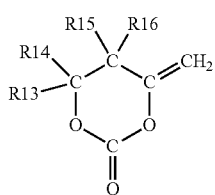

(5)

where each of R11 to R16 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds are bound,
wherein R11 and R12 are optionally bound to each other, and two or more of R13 to R16 are optionally bound to each other.

11. An electric vehicle, comprising:
a secondary battery;
a converter that converts electric power supplied from the secondary battery into drive power;
a drive section that operates based on the drive power; and
a controller that controls an operation of the secondary battery,
the secondary battery including a cathode, an anode, and a nonaqueous electrolytic solution,
the anode containing a carbon material and silicon oxide,
a weight ratio (%) of the silicon oxide to a total of the carbon material and the silicon oxide is within a range of 0.01% to 20% both inclusive, and
the nonaqueous electrolytic solution containing an unsaturated cyclic carbonate ester, wherein the unsaturated cyclic carbonate ester is a compound represented by formula (1),

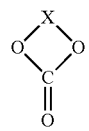

(1)

where X is a divalent group in which m-number of >C=CR1R2 and n-number of >CR3R4 are bound in any order, each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds thereof are bound to each other,
two or more of R1 to R4 are optionally bound to each other, m is an integer satisfying m≥1, and n is an integer satisfying n≥0,
wherein the compound by the formula (1) contains one or both of a compound represented by formula (4) or a compound represented by formula (5),

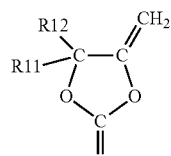

(4)

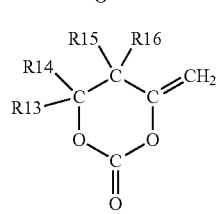

(5)

where each of R11 to R16 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds are bound, wherein R11 and R12 are optionally bound to each other, and two or more of R13 to R16 are optionally bound to each other.

12. An electric power storage system, comprising:

a secondary battery;

one or more electric devices that are supplied with electric power from the secondary battery; and a controller that controls the supply of the electric power from the secondary battery to the one or more electric devices, the secondary battery including a cathode, an anode, and a nonaqueous electrolytic solution, the anode containing a carbon material and silicon oxide, a weight ratio (%) of the silicon oxide to a total of the carbon material and the silicon oxide is within a range of 0.01% to 20% both inclusive, and the nonaqueous electrolytic solution containing an unsaturated cyclic carbonate ester, wherein the unsaturated cyclic carbonate ester is a compound represented by formula (1),

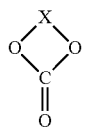

(1)

where X is a divalent group in which m-number of >C=CR1R2 and n-number of >CR3R4 are bound in any order, each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds thereof are bound to each other, two or more of R1 to R4 are optionally bound to each other, m is an integer satisfying m≥1, and n is an integer satisfying n≥0, wherein the compound represented by the formula (1) contains one or both of a compound represented by formula (4) or a compound represented by formula (5),

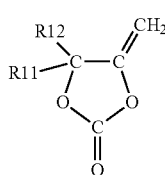

(4)

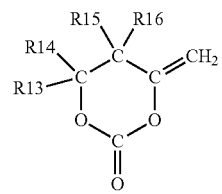

(5)

where each of R11 to R16 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds are bound, wherein R11 and R12 are optionally bound to each other, and two or more of R13 to R16 are optionally bound to each other.

13. An electric power tool, comprising:

a secondary battery; and a movable section that is supplied with electric power from the secondary battery, the secondary battery including a cathode, an anode, and a nonaqueous electrolytic solution, the anode containing a carbon material and silicon oxide, a weight ratio (%) of the silicon oxide to a total of the carbon material and the silicon oxide is within a range of 0.01% to 20% both inclusive, and the nonaqueous electrolytic solution containing an unsaturated cyclic carbonate ester, wherein the unsaturated cyclic carbonate ester is a compound represented by formula (1),

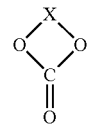

(1)

where X is a divalent group in which m-number of >C=CR1R2 and n-number of >CR3R4 are bound in any order, each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds thereof are bound to each other, two or more of R1 to R4 are optionally bound to each other, m is an integer satisfying m≥1, and n is an integer satisfying n≥0, wherein the compound represented by the formula (1) contains one or both of a compound represented by formula (4) or a compound represented by formula (5),

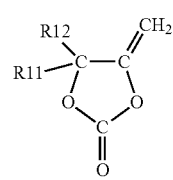

(4)

-continued

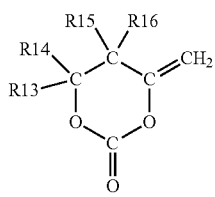

(5)

where each of R11 to R16 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds are bound, wherein R11 and R12 are optionally bound to each other, and two or more of R13 to R16 are optionally bound to each other.

14. An electronic apparatus, comprising:
a secondary battery as an electric power supply source, the secondary battery including a cathode, an anode, and a nonaqueous electrolytic solution,
the anode containing a carbon material and silicon oxide,
a weight ratio (%) of the silicon oxide to a total of the carbon material and the silicon oxide is within a range of 0.01% to 20% both inclusive, and
the nonaqueous electrolytic solution containing an unsaturated cyclic carbonate ester, wherein the unsaturated cyclic carbonate ester is a compound represented by formula (1),

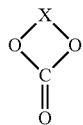

(1)

where X is a divalent group in which m-number of >C=CR1R2 and n-number of >CR3R4 are bound in any order, each of R1 to R4 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, and a group in which two or more kinds thereof are bound to each other, two or more of R1 to R4 are optionally bound to each other, m is an integer satisfying m≥1, and n is an integer satisfying n≥0, wherein the compound represented by the formula (1) contains one or both of a compound represented by formula (4) or a compound represented by formula (5),

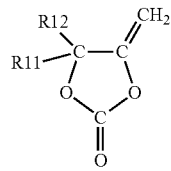

(4)

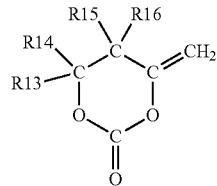

(5)

where each of R11 to R16 is one of a hydrogen group, a halogen group, a monovalent hydrocarbon group, a monovalent oxygen-containing hydrocarbon group, a monovalent halogenated hydrocarbon group, a monovalent halogenated oxygen-containing hydrocarbon group, or a group in which two or more kinds are bound, wherein R11 and R12 are optionally bound to each other, and two or more of R13 to R16 are optionally bound to each other.

* * * * *